(12) United States Patent
Wong et al.

(10) Patent No.: US 8,280,194 B2
(45) Date of Patent: Oct. 2, 2012

(54) REDUCED HARDWARE IMPLEMENTATION FOR A TWO-PICTURE DEPTH MAP ALGORITHM

(75) Inventors: Earl Quong Wong, San Jose, CA (US);
Pingshan Li, Sunnyvale, CA (US);
Soroj Triteyaprasert, Bangkok (TH);
Hidenori Kushida, Yokohama (JP);
Makibi Nakamura, Tokyo (JP);
Yoshihiro Murakami, Atsugi (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 937 days.

(21) Appl. No.: 12/111,548

(22) Filed: Apr. 29, 2008

(65) Prior Publication Data

US 2009/0268985 A1    Oct. 29, 2009

(51) Int. Cl.
*G06K 9/32* (2006.01)
*G06K 15/02* (2006.01)
*G09G 5/00* (2006.01)

(52) U.S. Cl. .......................... 382/299; 345/660; 358/1.2

(58) Field of Classification Search .................. 382/162, 382/174, 254, 255, 264, 275, 279, 299, 305, 382/312; 358/1.2; 345/591, 593, 615, 660, 345/670

See application file for complete search history.

(56) References Cited

U.S. PATENT DOCUMENTS

| | | |
|---|---|---|
| 4,349,254 A | 9/1982 | Jyojk et al. |
| 4,751,570 A | 6/1988 | Robinson |
| 4,947,347 A | 8/1990 | Sato |
| 4,965,840 A | 10/1990 | Subbarao |
| 5,148,209 A | 9/1992 | Subbarao |
| 5,170,202 A * | 12/1992 | Bell .............................. 396/80 |
| 5,212,516 A | 5/1993 | Yamada et al. |
| 5,231,443 A | 7/1993 | Subbaraeo |
| 5,365,597 A | 11/1994 | Holeva |
| 5,432,331 A | 7/1995 | Wertheimer |
| 5,534,924 A | 7/1996 | Florant |
| 5,577,130 A | 11/1996 | Wu |
| 5,604,537 A | 2/1997 | Yamazaki et al. |
| 5,696,848 A | 12/1997 | Patti et al. |
| 5,703,637 A | 12/1997 | Miyazaki et al. |
| 5,705,803 A | 1/1998 | Lisson et al. |
| 5,752,100 A | 5/1998 | Schrock |

(Continued)

FOREIGN PATENT DOCUMENTS

JP    8329875 A    12/1996

(Continued)

OTHER PUBLICATIONS

Pettersson, Niklas, "Online Stereo Calibration using FPGAs", http://nice.se/publications/bettersson_thesis 2005.pdf, 2005, pp. 1-6.

(Continued)

*Primary Examiner* — Kanjibhai Patel
(74) *Attorney, Agent, or Firm* — Blakely, Sokoloff, Taylor & Zafman LLP

(57) ABSTRACT

An imaging system generates a picture depth map from a pair of reduced resolution images. The system captures two full resolution images, receives image reduction image information and creates two reduced resolution images. The system computes a blur difference between the two reduced resolution images at different image locations. The system calculates the depth map based on the blur difference between the two reduced resolution images at different image locations.

20 Claims, 40 Drawing Sheets

U.S. PATENT DOCUMENTS

| | | | |
|---|---|---|---|
| 5,793,900 | A | 8/1998 | Nourbakhsh et al. |
| 6,023,056 | A | 2/2000 | Fiete et al. |
| 6,130,417 | A | 10/2000 | Hashimoto |
| 6,177,952 | B1 | 1/2001 | Tabata et al. |
| 6,219,461 | B1 | 4/2001 | Wallack |
| 6,229,913 | B1 | 5/2001 | Nayar et al. |
| 6,268,863 | B1 | 7/2001 | Rioux |
| 6,456,737 | B1 | 9/2002 | Woodfill et al. |
| 6,504,571 | B1 | 1/2003 | Narayanaswami et al. |
| 6,650,704 | B1 | 11/2003 | Carlson et al. |
| 6,677,948 | B1 | 1/2004 | Wasserman et al. |
| 6,683,652 | B1 | 1/2004 | Ohkawara et al. |
| 6,829,383 | B1 | 12/2004 | Berestov |
| 6,876,776 | B2 | 4/2005 | Recht |
| 6,891,966 | B2 | 5/2005 | Chen |
| 6,925,210 | B2 | 8/2005 | Herf |
| 7,019,780 | B1 | 3/2006 | Takeuchi et al. |
| 7,035,451 | B2 | 4/2006 | Harman et al. |
| 7,187,413 | B2 * | 3/2007 | Alderson ............... 348/353 |
| 7,303,131 | B2 | 12/2007 | Carlson et al. |
| 7,340,077 | B2 | 3/2008 | Goturk et al. |
| 7,359,576 | B1 | 4/2008 | Worthington et al. |
| 7,409,103 | B2 * | 8/2008 | Nishi et al. ............... 382/275 |
| 7,471,330 | B2 | 12/2008 | Okawara |
| 7,616,254 | B2 | 11/2009 | Wong et al. |
| 7,616,826 | B2 | 11/2009 | Freeman et al. |
| 7,657,119 | B1 | 2/2010 | Georgiev et al. |
| 7,711,201 | B2 * | 5/2010 | Wong et al. ............... 382/254 |
| 7,801,428 | B2 * | 9/2010 | Nagaishi et al. ............. 396/55 |
| 7,880,800 | B2 | 2/2011 | Sasaki et al. |
| 7,929,801 | B2 * | 4/2011 | Nakamura et al. ......... 382/285 |
| 7,941,002 | B2 * | 5/2011 | Samadani et al. .......... 382/298 |
| 7,941,042 | B2 | 5/2011 | Park et al. |
| 2003/0067536 | A1 | 4/2003 | Boulanger et al. |
| 2003/0231792 | A1 | 12/2003 | Zhang et al. |
| 2004/0008269 | A1 | 1/2004 | Zomet et al. |
| 2004/0027450 | A1 | 2/2004 | Yoshino |
| 2004/0036763 | A1 | 2/2004 | Swift et al. |
| 2004/0125228 | A1 | 7/2004 | Dougherty |
| 2004/0131348 | A1 | 7/2004 | Ohba et al. |
| 2004/0196379 | A1 | 10/2004 | Chen et al. |
| 2004/0252906 | A1 | 12/2004 | Liege et al. |
| 2005/0019000 | A1 | 1/2005 | Lim et al. |
| 2005/0104969 | A1 | 5/2005 | Schoelkopf et al. |
| 2005/0105823 | A1 | 5/2005 | Aoki |
| 2005/0220358 | A1 | 10/2005 | Blonde et al. |
| 2005/0265580 | A1 | 12/2005 | Antonucci et al. |
| 2006/0038891 | A1 | 2/2006 | Okutomi et al. |
| 2006/0120706 | A1 | 6/2006 | Cho et al. |
| 2006/0221179 | A1 | 10/2006 | Seo et al. |
| 2006/0256229 | A1 | 11/2006 | Wernersson |
| 2006/0285741 | A1 | 12/2006 | Subbarao |
| 2006/0285832 | A1 | 12/2006 | Huang |
| 2007/0014468 | A1 | 1/2007 | Gines et al. |
| 2007/0019883 | A1 | 1/2007 | Wong et al. |
| 2007/0036427 | A1 | 2/2007 | Nakamura et al. |
| 2007/0040924 | A1 | 2/2007 | Cho et al. |
| 2007/0189750 | A1 | 8/2007 | Wong et al. |
| 2007/0216765 | A1 | 9/2007 | Wong et al. |
| 2007/0297784 | A1 | 12/2007 | Wong et al. |
| 2008/0007626 | A1 | 1/2008 | Wernersson |
| 2008/0080846 | A1 | 4/2008 | Grip |
| 2008/0089598 | A1 | 4/2008 | George et al. |
| 2008/0107411 | A1 | 5/2008 | Hope |
| 2008/0297648 | A1 | 12/2008 | Furuki et al. |
| 2009/0015681 | A1 | 1/2009 | Pipkorn |
| 2009/0079862 | A1 | 3/2009 | Subbotin |
| 2009/0186655 | A1 | 7/2009 | Wernersson |
| 2009/0268985 | A1 | 10/2009 | Wong et al. |
| 2009/0316995 | A1 | 12/2009 | Szeliski et al. |
| 2010/0053417 | A1 | 3/2010 | Baxansky |
| 2010/0080482 | A1 | 4/2010 | Wong et al. |
| 2010/0194971 | A1 | 8/2010 | Li et al. |

FOREIGN PATENT DOCUMENTS

| | | |
|---|---|---|
| JP | 10108152 | 4/1998 |
| JP | 22313-1450 A2 | 1/2002 |
| JP | 2004048644 | 12/2004 |
| TW | 233523 B | 6/2005 |
| WO | WO 02/098128 A1 | 12/2002 |
| WO | WO 2007/022329 A2 | 2/2007 |
| WO | WO2007057808 A1 | 5/2007 |
| WO | WO 2007057808 A1 | 5/2007 |
| WO | WO 2007147999 A1 | 12/2008 |

OTHER PUBLICATIONS

Ghita, Ovidiu and Whelan, Paul, "Real-Time 3D Estimation Using Depth from Defocus", www.vsq.dcu.ie/papers/vision_2000.pdf, 2000, Third Quarter, vol. 16, No. 3, pp. 1-6.

Alex Paul Pentland, "A New Sense for Depth of Field", 1987, pp. 1-15, IEEE.

Shang-Hong Lai, Chang-Wu Fu and Shyang Chang, "A Generalized Depth Estimation Algorithm with a Single Image", 1992, pp. 405-411, IEEE.

John Ens and Peter Lawrence, "An Investigation of Methods for Determining Depth from Focus", 1993, pp. 97-108, IEEE.

Gopal Surya and Murali Subbarao, "Depth from Defocus by Changing Camera Aperture: A Spatial Domain Approach", 1993, pp. 61-67, IEEE.

Mats Gokstorp, "Computing depth from out-of-focus blur using a local frequency representation", 1994, pp. 153-158, IEEE.

Gunther Schneider, Bernard Heit, Johannes Honig, and Jacques Bremont, "Monocular Depth Perception by Evaluation of the Blur in Defocused Images", 1994, pp. 116-119, IEEE.

Murali Subbarao, Tse-Chung Wei, and Gopal Surya, "Focused Image Recovery from Two Defocused Images Recorded with Different Camera Settings", 1995, pp. 1613-1628, IEEE.

Shree K. Nayar, Masahiro Watanabe and Minori Noguchi, Real-Time Focus Range Sensor, 1996, pp. 1186-1198.

Masahiro Watanabe and Shree K. Nayar, "Minimal Operator Set for Passive Depth from Defocus", 1996, pp. 431-438, IEEE.

Johannes Honig, Bernard Heit and Jacques Bremont, "Visual Depth Perception Based on Optical Blur", 1996, pp. 721-724, IEEE.

A.N. Rajagopalan and S. Chaudhur I, "A Variational Approach to Recovering Depth From Defocused Images", 1997, pp. 1158-1164, IEEE.

D. Ziou, S. Wang and J. Vaillancourt, "Depth from Defocus Using the Hermite Transform", 1998, pp. 958-962, IEEE.

Shinsaku Hiura and Takashi Matsuyama, Depth Measurement by the Multi-Focus Camera, 7 pp., Department of Science and Technology, Japan.

Christophe Simon and Frederique Bicking, "Estimation of depth on thick edges from sharp and blurred images", 2002, pp. 323-328, IEEE.

Ovidiu Ghita, Paul F. Whelan and John Mallon, "Computational approach for depth from defocus", Apr.-Jun. 2005 pp. 023021-1-023021-8, vol. 14(2), Journal of Electronic Imaging.

Tony Lindeberg, "On the axiomatic foundations of linear scale-space: Combining semi-group structure with causality vs. scale invariance", pp. 1-24, 1994, Computational Vision and Action Perception Laboratory (CVAP), Klumer Academic,Sweden.

B.P. Horn, "Robot Vision", 1986, pp. 18-28, MIT Press, New York, McGraw-Hill.

Yalin Xiong, Steven A. Shafer, "Depth from Focusing and Defocusing", 1993, pp. 68-73, IEEE, Pittsburgh, PA.

Kang-Sun Choi, Jun-Suk Lee and Sung-Jae Ko, "New AutoFocusing Technique Using the Frequency Selective Weighted Median Filter for Video Cameras", Jun. 28, 1999, pp. 820-827, IEEE, Korea University, Korea.

L. Firestone, K. Cook, K. Culp, N. Talsania, K. Preston Jr., "Comparison of autofocus methods for automated microscopy", Mar. 13, 2006, pp. 195-206, Department of Electrical and Computer Engineering, Carnegie Mellon University, Pittsburgh, PA.

Jie He, Rongzhen Zhou, Zhiliang Hong, "Modified fast climbing search auto-focus algorithm with adaptive step size searching technique for digital camera", May 2003, pp. 257-262, Consumer Electronics, IEEE Transactions.

Ohba, et al., "Real-Time Micro Environmental Observation With Virtual Reality", 2000, International Conference on Pattern Recognition, vol. 4, pp. 487-490.

Ohba, et al., "Microscopic Vision System With All-In-Focus and Depth Images", Dec. 2003, Machine Vision and Applications, vol. 15, Issue 2, pp. 55-62.

Darrell, et al., "Pyramid Based Depth From Focus", 1988, pp. 504-509.

Blickgesteuerte PC-Steuerung,Forschung&Entwicklung, XP-000725834, Publiation Date Aug. 4, 1997, pp. 76-78.

21st Century 3D: 3DVX3 Press Release; 21st Century 3D Introduces Uncompressed 4:4:4 Steroscopic camera System-3DVX3; San Jose Convention Center Jan. 18, 2006 SPIE Steroscopic Displays and Applications conference.

Three-dimensional Camera Phone; Smithsonian/NASA ADS Physics Abstract Service; find Similar Abstracts (with default settings below); Electronic Refereed Journal Article (HTML); Full Refereed Journal Article (PDF/Postscript); Reads History; Translate Abstract; Title: Three-dimensional Camera Phone, Authors: Iizuka, Kiego, Publications: Applied Optics IP, vol. 43, pp. 6285-6292, Publication Date: Dec. 2004, Origin: WEB, Bibliographic Code: 2004ApOpt.. 43.6285I.

Real-time view interpolation system for a super multiview 3D display; processing; Smithsonian/NASA ADS Physics Abstract Service; find Similar Abstracts (wtih default settings below); Table of Contents; Also-Read Articles (Reads History); Translate Abstract; Title: Real-Time view interpolastion system for a super multiview 3D display; processsing implementation and evalutaion; Authors: Hamaguchi, Tadahiko, Fujii, Toshiaki; Honda, Toshio; Affiliation: AA (Telecommunications Advancement Organization of Japan) AB (Telecommunications Advancement Organization of Japan and Nagoya Univ.) AC (Telecommunications Advancement Organization of Japan and Chiba Univer.); Publication; Proc. SPIE vol. 4660, p. 105-115, Steroscopic Displays and Virtual Reality Systems, IX, Andrew J. Woods; John O. Merritt; Stephen A. Benton; Mark T. Bolas; Eds. (Spie Homepage); Publication Date: May 2002; Origin: SPIE; Abstract Copyright: 2002 SPIE-The Internantion Society for Optical Engineering, Downloading of the abstract is perrmitted for personal use only; Bibliographi Code: 2002SPIE.4600..105H.

3D displays; Using cellphane to convert a liquid crystal display screen into a three dimensional display (3D laptop computer and 3D Camera phone); Keigo Iizuka; Department of Electrical & Computer Engineering, 35 St. George Stree, University of Toronto, Toronto, Ontario, Canada M5S 1A4.

Eugene Hecht, Optics 3rd Edition, Addison-Wesley, The Propagation of Light, Chapter 4, p. 126.

Klaus Berthold, Paul Horn, "Robot Vision", 1986, pp. 1-509.

Tony Lindeberg, "Scale-Space Theory: A Basic Tool for Analysing Structures At Different Scales", Journal of Applied Statistics, vol. 21, No. 2, pp. 225-270, 1994.

European Patent Office, Extended European Search Report, EP application No. 10 15 0104—counterpart to U.S. Appl. No. 12/363,511, issued May 20, 2010.

U.S. App. No. 12/242,805 (not yet published)-Filing Date Sep. 30, 2008"Fast Camera Auto-Focus".

Yao, Yi, et al.-"Auto-focusing in extreme zoom surveillance: a system approach with application to faces" —Advances in Visual Computing, Second International Symposium, ISVC 2006, Lake Tahoe, NV, USA; Nov. 6-8, 2006.

Chiang. Ming-Chao and Boult, Terrance E., "Local Blur Estimation and Super Resolution," 1997 IEEE CVPR Proceedings, 6 pages.

Huang, Mao-Yu, Tseng, Din-Chang and Liu, Michael S.C., "Wavelet Image Enhancement Based on Teager Energy Operator," IEEE, 2002, pp. 993-996.

Earl Wong, "A New Method for Creating a Depth Map for Camera Auto Focus Using an All In Focus Picture and 2D Scale Space Matching", Acoustics, Speech and Signal Processing, 2006. ICASSP 2006 Proceedings. 2006 IEEE International Conference on vol. 3, May 14-19, 2006 pp. III-III.

Ziou, D. et al., "Depth from Defocus Estimation in Spatial Domain", Computer Vision and Image Understanding, vol. 81, No. 2, Feb. 1, 2001. pp. 143-165.

Subbarao et al., "Depth from Defocus: A Spatial Domain Approach", International Journal of Computer Vision, vol. 13. No. 3, pp. 271-294, 1994.

Tsai et al., "A Moment-Preserving Approach for Depth from Defocus", Pattern Recogn on, vol. 31, No. 5, pp. 551-560, 1998.

Xian, Tao et al,—"Depth-from-Defocus: Blur Equalization Technique"—Proc. Of SPIE, vol. 6382, 2006, pp. 63820E-1-63820E-10.

Deschenes, F. et al.—"Simultaneous Computation of Defocus Blur and Apparent Shifts in Spatial Domain"—15th International Conf. On Vision Interface, May 27-29, 2002, Calgary, Canada.

Leroy, Jean-Vincent et al.—"Real Time Monocular Depth from Defocus"—Lecture Notes in Computer Science, vol. 5099, proc. Of the 3rd International conf. On Image and Signal Processing, pp. 103-111 2008.

Gokstorp, Mark—"Computing depth from out-of-focus blur using a local frequency representa on"—Proc. Of the 12th IAPR International Conf. On Pattern Recognition, vol. 1, Conf. A: Computer Vision & Image Processing, vol. 1, Oct. 9-13, 1994, Jerusalem.

Park, Soon-Yong—"An image-based calibration technique of spatial domain depth-from-defocus"—Pattern Recognition Letters, vol. 27, 2006, pp. 1318-1324.

Zhang, Quanbing et al,—"A Novel Technique of Image-Based Camera Calibration in Depth-from-Defocus"—First International Conf. On Intelligent Networks and Intelligent Systems, Nov. 1-3, 2008, pp. 483-486.

Lee, S. et al. "Real-time Depth-of-Field Rendering Using Point Splatting on Per-Pixel Layers " Pacific Graphics, vol. 27, No. 7, pp. 1955-1962, 2008.

Kraus, M. "Quasi-Convolution Pyramidal Blurring"-GRAPP 2008, Proc. Of the 3rd Inter. Conf. On Comp. Graphics Theory and Applications, pp. 155-162, Portugal, Jan. 22-25, 2008.

Yuan, L. et al., "Blurred/Non-Blurred Images Alignment Using Sparseness Prior"—IEEE 11th Int. Conf. On Computer Vision, Oct. 14-17, 2007, Rio de Janeiro, pp. 1-8.

Krivanek, J. et al.—"Fast Depth of Field Rendering with Surface Splatting"—Proceedings from Computer Graphics International 2003.

Korean Intellectual Property Office, International Search Report and Written Opinion, counterpart PCT Application No. PCT/US2011/024832, including claims searched, Sep. 22, 2011, pp. 1-14.

European Patent Office, Extended Search Report, Issued on Feb. 24, 2011, including claims searched for corresponding EPO patent application No. 10190445.6, claiming priority to U.S. Appl. No. 12/643,802, pp. 1-10.

M.Baba et al., "A thin lens based camera model for depth estimation from defoucus and translation by zooming.", Proceeding of the 15th International Conference on Vision Interface, Calgary, Canada (2002).

* cited by examiner

REDUCED HARDWARE IMPLEMENTATION FOR A TWO-PICTURE DEPTH MAP ALGORITHM

RELATED APPLICATIONS

This patent application is related to the co-pending U.S. Patent Application, entitled "METHOD AND APPARATUS FOR GENERATING A DEPTH MAP UTILIZED IN AUTO-FOCUSING", application Ser. No. 11/473,694. The related co-pending application is assigned to the same assignee as the present application.

FIELD OF INVENTION

This invention relates generally to image acquisition, and more particularly a reduced hardware implementation that generates a depth map from two pictures.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2006, Sony Electronics, Incorporated, All Rights Reserved.

BACKGROUND

A depth map is a map of the distance from objects contained in a three dimensional spatial scene to a camera lens acquiring an image of the spatial scene. Determining the distance between objects in a three dimensional spatial scene is an important problem in, but not limited to, auto-focusing digital and video cameras, computer/robotic vision and surveillance.

There are typically two types of methods for determining a depth map: active and passive. An active system controls the illumination of target objects, whereas a passive system depends on the ambient illumination. Passive systems typically use either (i) shape analysis, (ii) multiple view (e.g. stereo) analysis or (iii) depth of field/optical analysis. Depth of field analysis cameras rely of the fact that depth information is obtained from focal gradients. At each focal setting of a camera lens, some objects of the spatial scene are in focus and some are not. Changing the focal setting brings some objects into focus while taking other objects out of focus. The change in focus for the objects of the scene at different focal points is a focal gradient. A limited depth of field inherent in most camera systems causes the focal gradient.

Capturing two images of the same scene using different lens positions for each image is a way to capture the change in blur information. Changing lens positions between the two images causes the focal gradient. However, a drawback of this system is that storage of at least two full-sized images is required.

SUMMARY

An imaging system generates a picture depth map from a pair of reduced resolution images. The system captures two full resolution images, receives image reduction information, and creates two reduced resolution images. The system computes a blur difference between the two reduced resolution images at different image locations. The system calculates the depth map based on the blur difference at different image locations.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
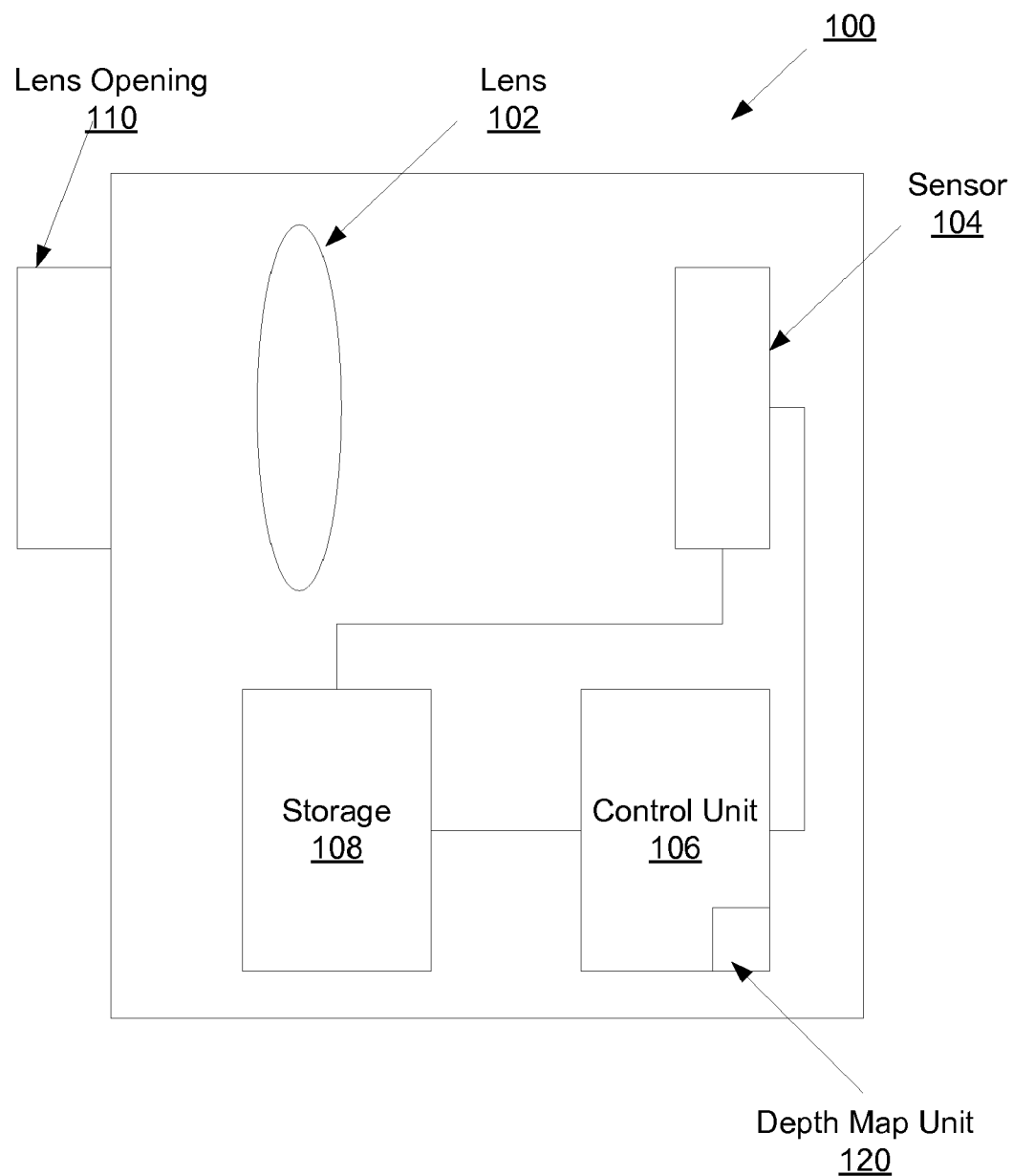
FIG. 1 (prior art) illustrates one embodiment of an imaging system.

FIG. 1 (prior art) illustrates one embodiment of an imaging system 100. In FIG. 1, imaging system comprises lens 102, sensor 104, control unit 106, storage 108, and lens opening 110. Imaging system 100 may be digital or film still camera, video camera, surveillance camera, robotic vision sensor, image sensor, etc. Sensor 104 captures an image of a scene through lens 102. Sensor 104 can acquire a still picture, such as in a digital or film still camera, or acquire a continuous picture, such as a video or surveillance camera. In addition, sensor 104 can acquire the image based on different color models used in the art, such as Red-Green-Blue (RGB), Cyan, Magenta, Yellow, Green (CMYG), etc. Control unit 106 typically manages the sensor 104 automatically and/or by operator input. Control unit 106 configures operating parameters of the sensor 104 and lens 102 such as, but not limited to, the lens focal length, f, the aperture of the lens, A, lens focus position, and (in still cameras) the lens shutter speed. In addition, control unit 106 may incorporate a depth map unit 120 (shown in phantom) that generates a depth map of the scene. The image(s) acquired by sensor 104 are stored in the image storage 108.

Figure 2:
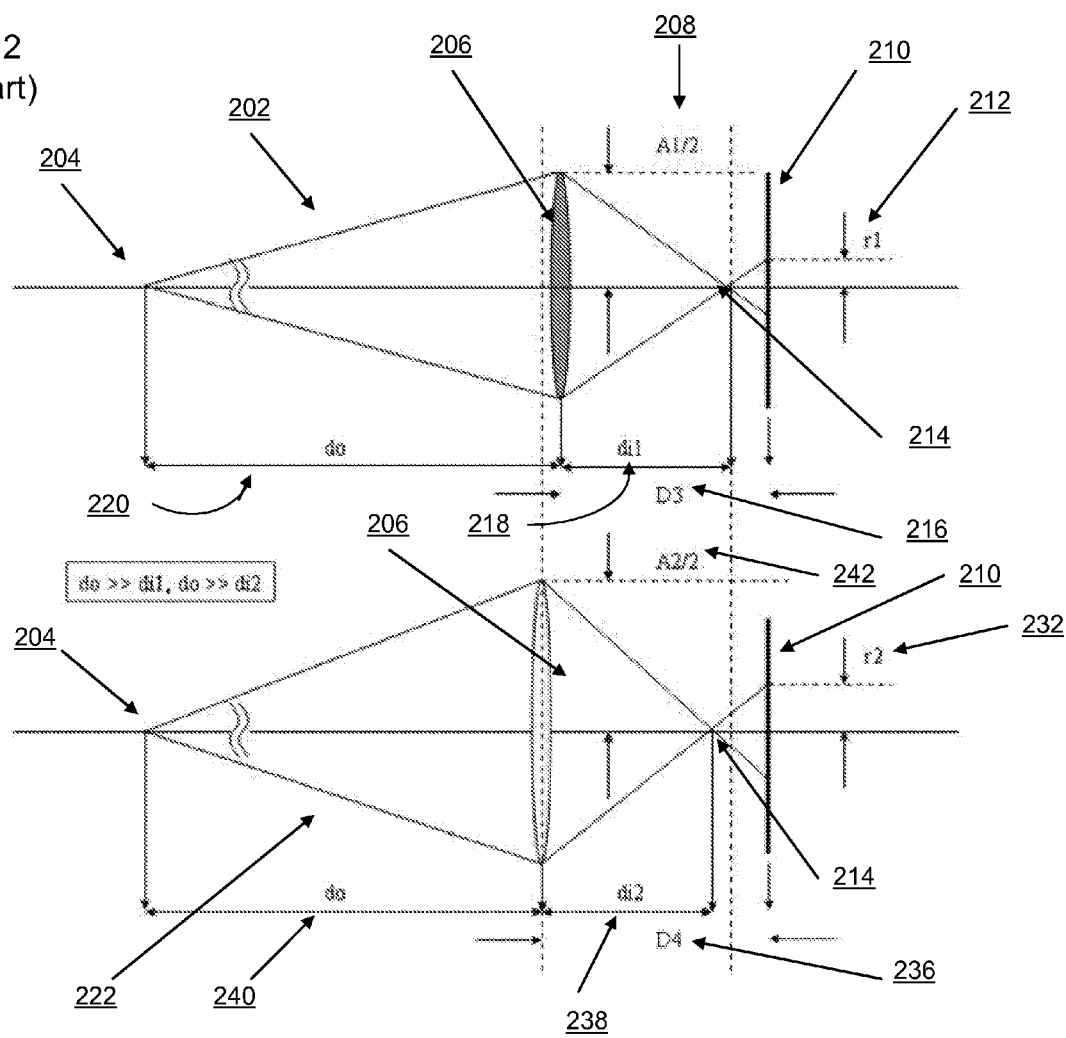
FIG. 2 (prior art) illustrates one embodiment of two imaging optics settings used by sensor 104 used to capture two pictures with different focal position and aperture.

FIG. 2 (prior art) illustrates one embodiment of two imaging optics settings used by imaging system 100 used to capture two images with different focal position. FIG. 2 illustrates one embodiment of two imaging optics settings used by sensor 104 used to capture two images with different aperture and focal position. In FIG. 2, sensor 104 uses optical setting 202 to capture a first image, $f_1$, of point 204 that is a distance $d_o$ from lens 206. Lens 206 uses a focus D3 216, aperture A1 208 and focal length f (not shown). The focal length is constant for the two optics settings 202 and 222. Furthermore, is it assumed for optics setting 202 that $d_o$ is much greater than $d_{i1}$, where $d_{i1}$ is the distance 218 between lens 206 and a properly focused point image 214. With these settings, image acquisition unit 100 captures a blurred image 212 of point 204 on image plane 210 with blur radius 212. As drawn, lens 206 is properly focused on point 204 if the image captured is point image 214.

In addition, sensor 104 uses optics settings 222 to capture the second image, f2. For the second image, lens 206 moves slightly farther from the image plane 210 (e.g. D4>D3) and, therefore, closer to point 204. Even though lens 206 has moved closer to point 204, because $d_o$ is much greater than $d_{i1}$ and $d_{i2}$, it is assumed that the distance between lens 206 and point 204 is the same (e.g. $d_o$) for both optics settings. Furthermore, lens 206 uses optics settings 222 that consists of focus D4 236, aperture A2 242, and focal length f. Comparing optics setting 222 and 202, optics settings 222 has a closer focusing point. As a result, the second image of point 204 captured through lens 206 with optics setting 222 results in image 232 with blur radius $r_2$ displayed on image plane 210. Furthermore, is it assumed for optics setting 222 that $d_o$ is much greater than $d_{i2}$, where $d_{i2}$ is the distance 238 between lens 206 and a properly focused point image 214.

As illustrated in FIG. 2, optics setting 222 results in image 232 on image plane 210 that has a larger blur radius, $r_2$, as compared with the blur radius, $r_1$, for image 212 using optics model 202. However, optics settings 202 and 222 are only an illustration of the relative blurring from one change in settings for one spatial scene (e.g., lens 206 position in optics setting 222 is to the right of lens 206 position in optics setting 202). Alternatively, a change in blur results from lens 206 position in optics setting 222 being to the right of lens 206 position in optics setting 202. In this embodiment, blur radius $r_2$ is larger that $r_1$. Nevertheless, the change in blur is the information required.

Figure 3:
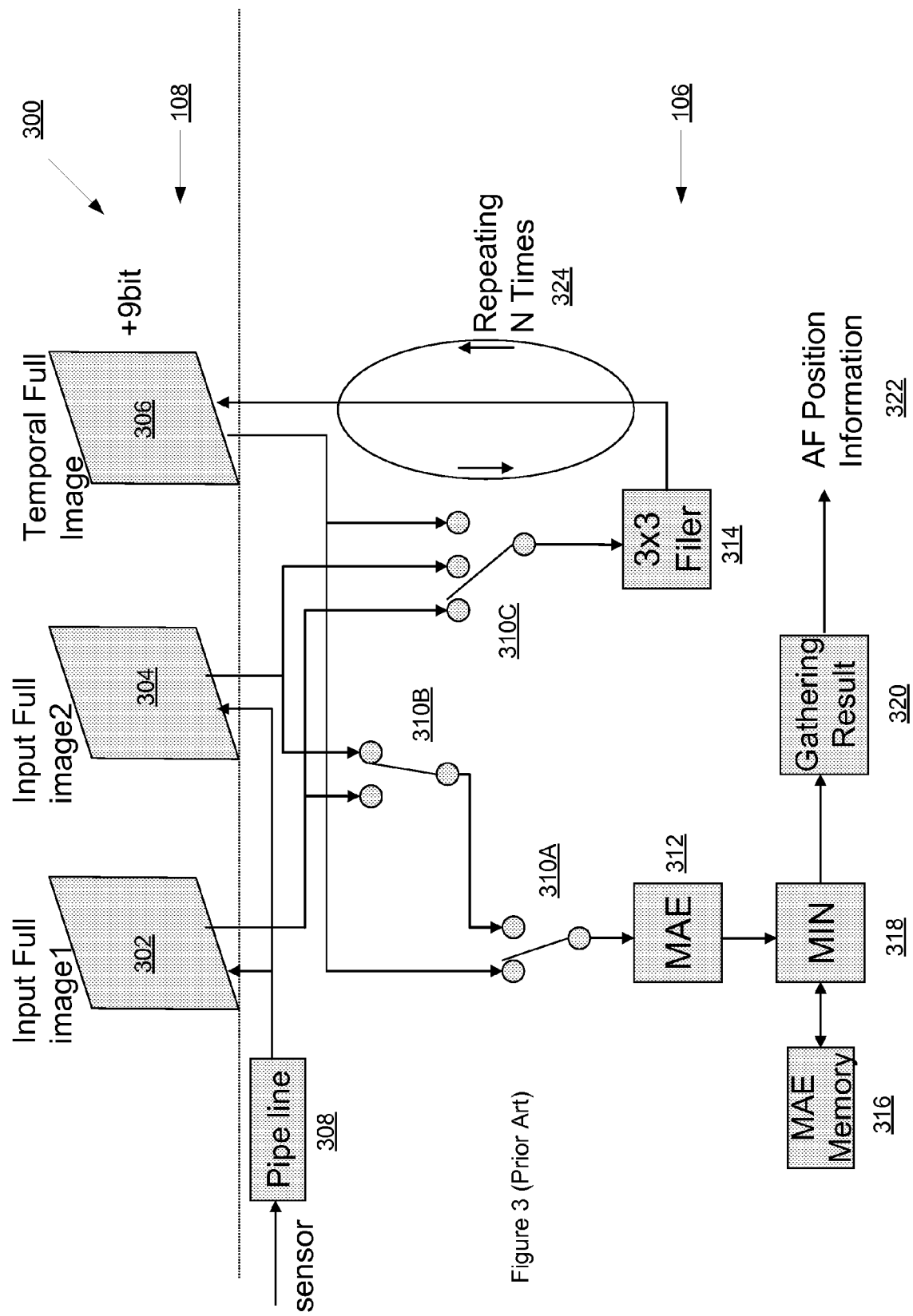
FIG. 3 (prior art) is a block diagram illustrating one embodiment of a system to generate a picture depth map from two full resolution images.

FIG. 3 (prior art) is a block diagram illustrating one embodiment of a system 300 to generate a picture depth map from two full resolution images. System 300 is one embodiment that computes a depth map for an image by determining the blur difference quantities between the two full resolution images captured at multiple lens 102 positions. Control unit 106 uses the captured images and simulates a Gaussian blur using the iteration of convolving kernel.

In one embodiment, system 300 convolves a first image with blur equal to $r_1$ with an approximate telescoping solution of a 3×3 kernel for N iterations to yield a blur, $r_2$, equal to the blur of the second image. This is further described in the co-pending U.S. Patent Application, entitled "METHOD AND APPARATUS FOR GENERATING A DEPTH MAP UTILIZED IN AUTOFOCUSING", application Ser. No. 11/473,694. In one embodiment, let h(x,y) denote the Gaussian blur kernel. In this embodiment, h(x,y) can be applied once or several times to one of the images in order to convolve one image into another. For example, let I1(x,y) and I2(x,y) represent the two captured images. Assume that both images have space invariant blur and assume that the amount of blur in I2(x,y) is greater than the amount of blur in I1(x,y), I2(x,y)~I1(x,y)*h(x,y)*h(x,y) . . . *h(x,y), where h(x,y) has been applied N=N1 times. System 300 uses the Gaussian blur quantity of h(x,y) applied N times to compute a depth map of the image. If I1(x,y) has greater blur than I2(x,y), I1(x,y)~I2(x,y)*h(x,y)*h(x,y) . . . . *h(x,y), where h(x,y) has been applied N=N2 times. Let N=Nmax denote the maximum possible number of applied convolutions. In practice, one image can be convolved into the other. For example, if I2(x,y) has less blur than I1(x,y), I2 cannot be convoluted into I1. Hence, I1(x,y)~I2(x,y)*h(x,y) . . . *h(x,y) will yield N=0. Similarly, if I1(x,y) has less blur than I2(x,y), I1(x,y)~I2(x,y)*h(x,y)* . . . *h(x,y) will yield N=0. In practice, the number of convolutions is given by the minimum number of non-zero convolutions (e.g. min_non_zero(N1,N2)).

For real images, the blur is space variant. Here, image blocks in the image are analyzed. In one embodiment, the selected regions consist of non-overlapping N×N blocks. If the blur in the selected block of an image is homogeneous (space invariant), the blur in I2 can be greater than the blur in I1, and vice versa. In order to obtain the appropriate N value, the blur convolution is applied in both directions. The minimum non-zero N value is selected for the given region. If the blur in the selected region of the image is inhomogeneous (space variant), the computed N value will be inaccurate. In either case, the convolution kernel is applied to both images. Specific regions of the image are then examined to determine the appropriate N value.

In FIG. 3, system 300 comprises control unit 106 and storage 108. Control unit 108 comprises pipeline 308, gates 310A-310C, MAE 312, 3×3 Filter 314, MAE memory 316, MIN 318, gathering result module 320 and auto-focus position module 322. Storage 108 comprises Input Full Image 302, Input Full Image 304, and Temporal Full Image 306. Input Full Images 302, 304 couple to sensor 104 via pipeline 308. In addition, Input Full Image 302 and 304 couple to gates 310A-C. Furthermore, temporal full image 306 couples to gates 310A-C. Mean Absolute Error (MAE) 312 couples to gate 310A and Minimum (MIN) 318. MIN 318 further couples to MAE memory 316 and gathering result module 320. Gathering result module 320 further couples to auto-focus position information module 322. 3×3 Filter 314 couples to gate 310C and Temporal Full Image 306.

Sensor 104 acquires Input Full Images 302, 304 at different optic settings. The different optic settings can be different lens focus positions, focal length, aperture, and/or a combination thereof. These images have different blur information. System 300 uses the different blur information to compute a blur difference. System 300 computes the blur difference by convolving one of Input Full Image 302 or 304 with the blur kernel into the other image. System 300 can convolve Input Full Image 302 into Input Full Image 304 or visa versa. System 300 stores one of Input Full Image 302 or 304 into Temporary Full Image 306. In this embodiment of system 300, Temporal Full Image 306 is the same size as Input Full Images 302, 304. With each iteration, System 300 convolves the image stored in Temporal Full Image 306 with 3×3 Filter 314 via gate 310C and generates an updated convolved image in Temporal Full Image 306. Convolving the stored image with 3×3 Filter 314 blurs that image.

In one embodiment, Input Full Image 302 has less blur than Input Full Image 304. In this embodiment, System 300 stores Input Full Image 304 in Temporary Full Image 306 and convolves this stored image with the blur kernel. MAE 312 computes the difference between the Temporary Full Image 306 and Input Full Images 304. System 300 repeats this convolving of blur kernel N times until system 300 generates a Temporal Full Image 306 that matches Input Full Image 304.

In an alternate embodiment, Input Full Image 302 has blocks of the image that are either sharper or blurrier than the corresponding blocks of Input Full Image 304. In this embodiment, System 300 convolves Input Full Image 302 with Filter 314 as above. System 300 matches blocks of the convolved image stored in Temporary Full Image 306 up to an iteration threshold N=Nmax. If the mean absolute error computed from block MAE 312 is minimum for N=0, these blocks of Input Full Image 302 have greater blur than the corresponding blocks of Input Full Image 304. For these blocks, System 300 stores Input Full Image 304 in Temporary Full Image 306. Furthermore, System 300 convolves this image with Filter 314 to determine the blur difference between the sharper blocks of Input Full Image 304 and the corresponding blurrier blocks of Input Full Image 302 as above. In one embodiment, for arbitrary images, blocks can also encompass space variant regions. These regions occur along the boundaries of an image. For example, the block encompasses part of the foreground and part of the background. Once again, two values are computed. The minimum non-zero value is then selected.

MIN 318 receives the blur difference (iterative values represented by N) and determines the minimum non-zero N value. This value is stored in MAE memory 316. In addition, MIN 318 further computes the depth information from the received blur difference and forwards the depth information to Gathering Results module 320. Gathering Results module 320 gathers the depth information and forwards it to autofocus position information module 322, which uses the depth information for auto-focusing applications.

A drawback of system 300 is that storage of three full-sized images is required. Because a full-sized image is related to sensor 104, as sensor size increases, the amount of information to process increases and the amount of storage for system 300 increases threefold. Furthermore, because of the large image sizes, converging on the Temporal Full Image 306 can require a large number of calculations. The number of convolution iterations required can be on the magnitude of several hundred. However, full sized images are not necessarily needed to generate depth maps from images. In addition, reduced resolution images have less information to process. Thus, a system can generate a depth map using reduced resolution images.

Figure 4:
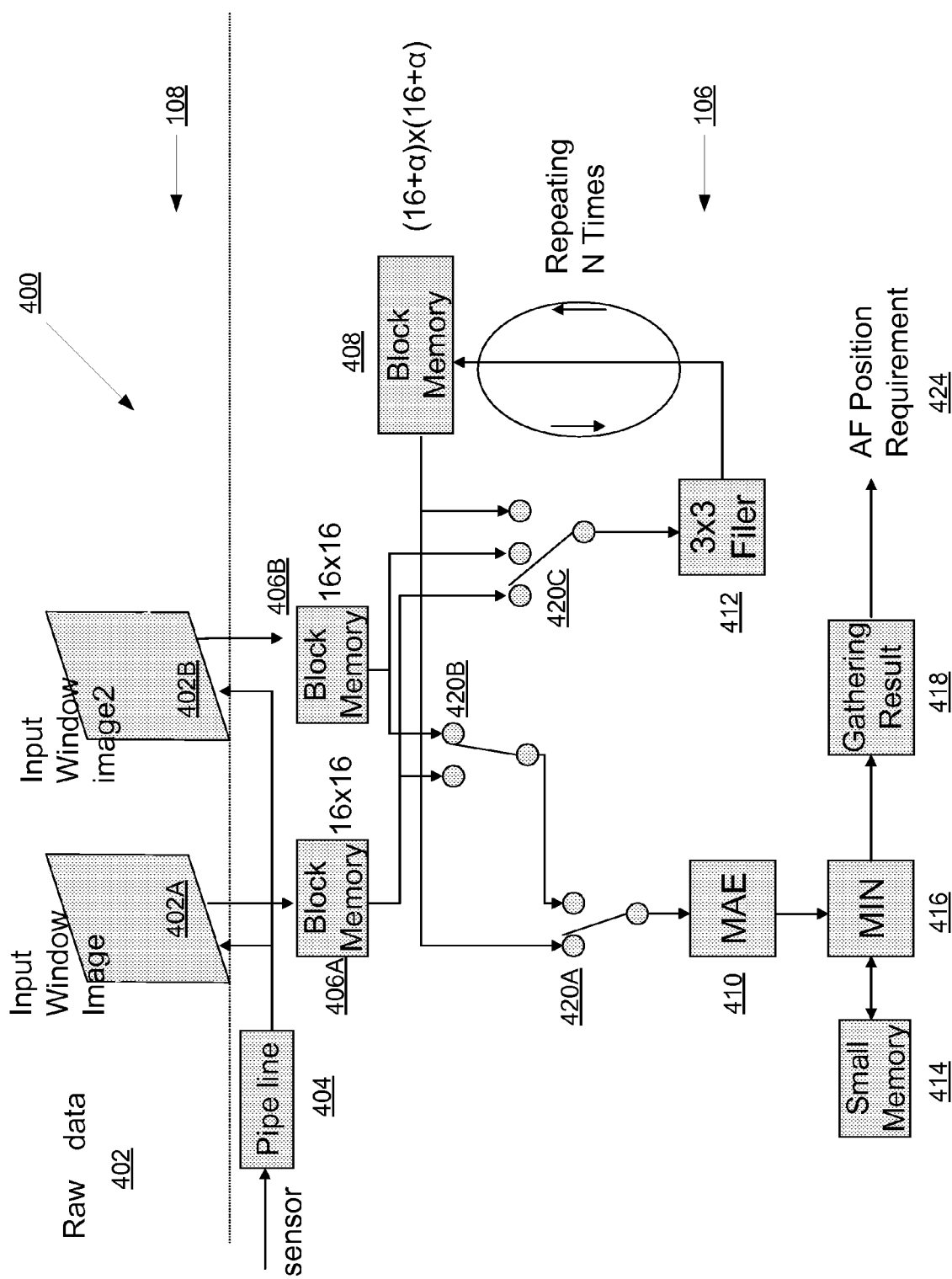
FIG. 4 is a block diagram illustrating one embodiment of a system to generate a picture depth map from two reduced resolution images.

FIG. 4 is a block diagram illustrating one embodiment of a system 400 to generate a picture depth map from two reduced resolution images. In FIG. 4, system 400 uses two reduced resolution images to compute the depth information. System 400 comprises control unit 106 and storage 108. Control unit 106 comprises pipeline 404, block memories 406A-B, block memory 408, MAE 410, 3×3 Filter 412, Small Memory 414, MIN 416, Gathering Result Module 418, and AF Position Requirement Module 424. Storage 108 comprises Raw Data 402 and Input Window Images 402A-B. As stated above, Input Window Images 402A-B are smaller than Input Full Images 302, 304 used for system 300 above. Reduced images are further described in FIG. 6, below.

Input Window Images 402A-B couple to sensor 104 via pipeline 404. In addition, Input Window Images 402A-B couple to Block Memories 406A-B, respectively. Block Memory 406A and 406B couple to gates 420A-C and Block Memory 408 couples to 420A and C. MAE 410 couples to gate 420A and MIN 416. MIN 416 further couples to Small Memory 414 and gathering result module 418. Gathering result module 418 further couples to auto-focus position information module 424. 3×3 Filer 412 couples to gate 420C and Block Memory 408.

In one embodiment, system 400 derives the reduced images, Input Window Image 402A-B, from raw image data gathered at different lens positions. Similar to the full resolution images, Input Window Image 402A-B represent different optic settings and contain different blur information about the image. In one embodiment, system 400 reduces the raw data by a k-factor, meaning the number of pixels along the x and y axis of the image is reduced by factor k. In this embodiment, the number of pixels in the reduced images, Input Window Image 402A-B, is $1/k^2$ the raw data pixel number. For example, in one embodiment, the raw data is ten megapixels, which is an images size of 3888×2592 pixels. If Input Window Images 402A-B are reduced by a k-factor of 10, Input Window Images 402A-B are 389×259 pixels.

Instead of convolving whole images as done by System 300, System 400 convolves one or more individual reduced image blocks. System 400 stores blocks of Input Window Images 402A-B in block memory 406A-B, respectively. In one embodiment, block memory 406A-B for the input images is 16×16 pixels large. Furthermore, system 400 uses block memory 408 to store a convolved image block generated by the system iterative calculations.

System 400 convolves the one or more image blocks in block memory 408 with 3×3 Filter 412, generating an updated block image in block memory 408. In one embodiment, block memory 408 holds a block of Input Window Image 402A. This embodiment is used for blocks of Input Full Image 302 that are sharper than Input Full Image 304. System 400 convolves this block with Filter 412 into the corresponding block stored in block memory 406B to determine the blur difference between the two blocks. Conversely, in another embodiment, block memory 408 holds a block of Input Window Image 402B. System 400 convolves this block with Filter 412 into the corresponding block stored in block memory 406A to determine the blur difference between the two blocks. This embodiment is used for blocks of Input Window Image 402B that are sharper than the corresponding blocks of Input Window Image 402A.

System 400 repeats this process N times until system 400 generates a converged block image in block memory 408. MAE 410 computes the blur difference.

Between the Input Window Images 402A-B, MIN 416 receives the blur difference iterative values represented by N, determines the minimum non-zero N value and accumulates the results in Small Memory 414. MIN 416 further computes the depth information from the received blur difference and forwards the depth to Gathering Results module 418. Gathering Results module 418 gathers the depth information and forwards it to auto-focus position information module 424, which uses the depth information for auto-focusing applications. As will be described below, system 400 achieves comparable depth map results with less computation iterations and using fewer resources. For example, the number of convolution iterations can be less than or equal to twenty. See, for example, FIG. 17 below.

Figure 5:
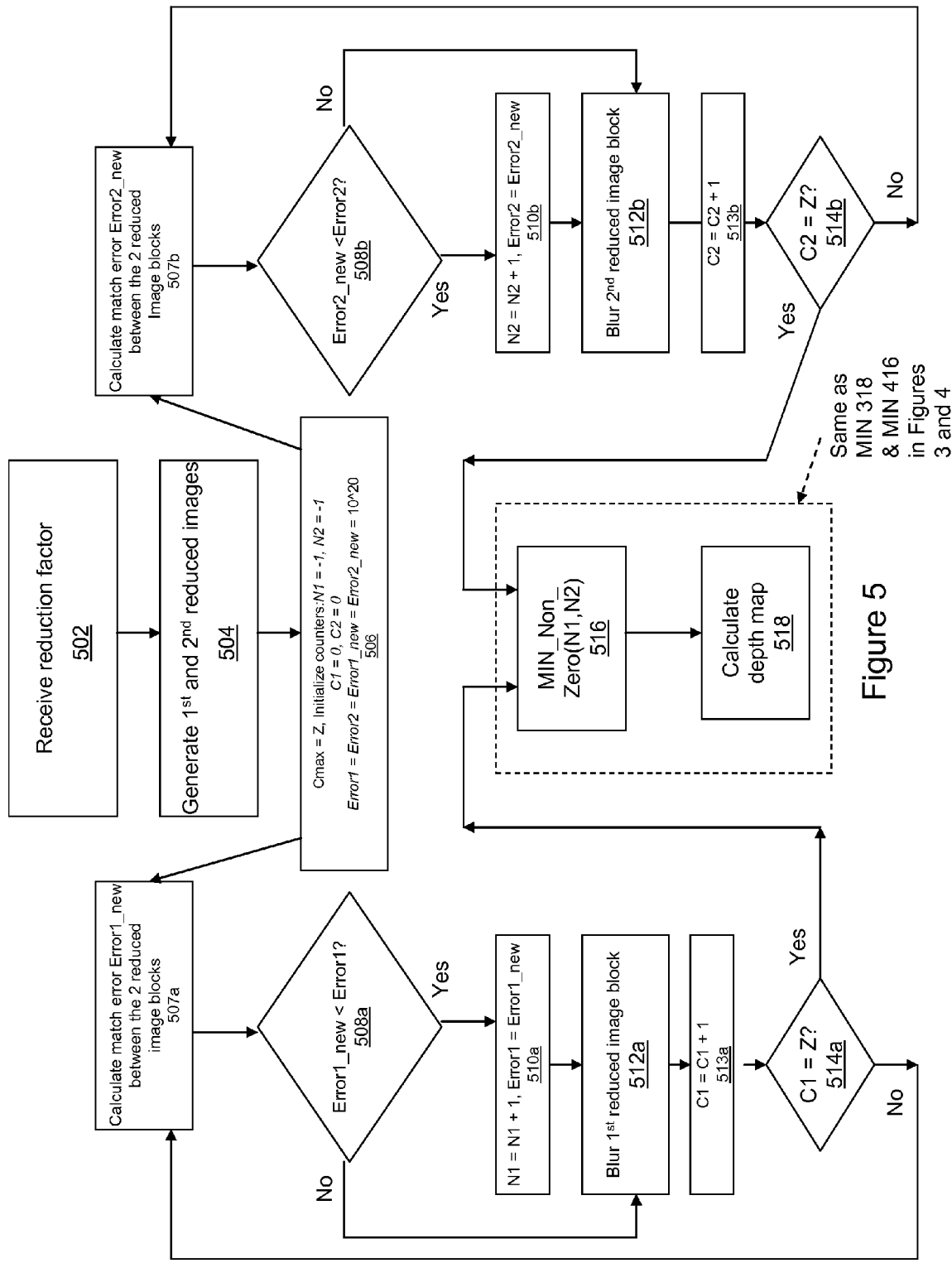
FIG. 5 is a flow chart of one embodiment of a method to generate a picture depth map using two reduced resolution images.

FIG. 5 is a flow chart of one embodiment of a method 500 to generate a picture depth map using two reduced resolution images. In FIG. 5, at block 502, method 500 receives a reduction factor. In one embodiment, the reduction factor is the k-factor described above, in which the full image x and y pixel dimensions are reduced by a factor k. Reducing each dimension by the same factor preserves the aspect ratio of the full image. Alternatively, the reduction factor is defined using other known algorithms.

Figure 6:
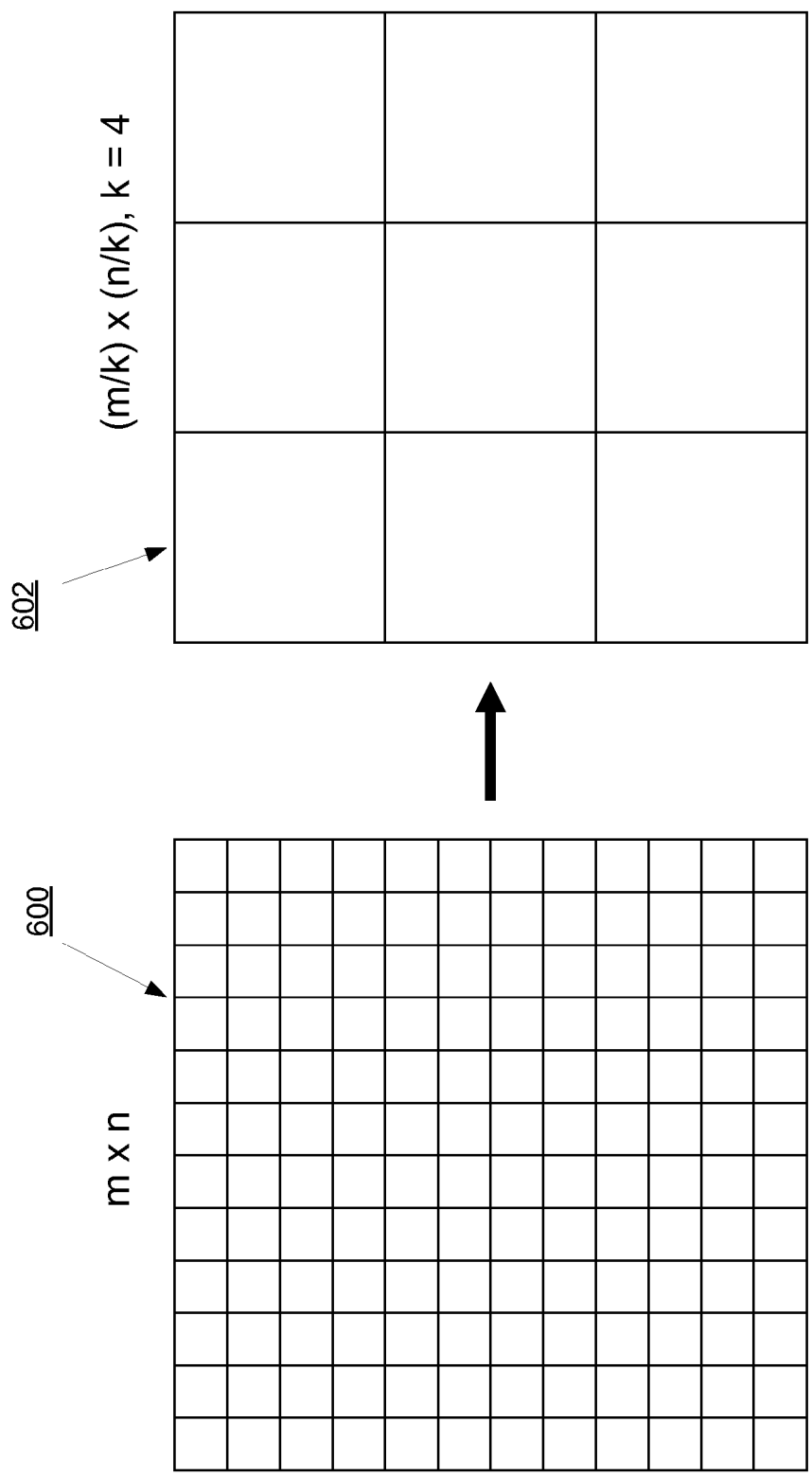
FIG. 6 is a block diagram illustrating one embodiment of full resolution image reduced to a reduced resolution image.

At block 504, method 500 generates the first and second reduced image. In one embodiment, method 500 receives full images at a first and second lens position and converts the full images to the reduced images. FIG. 6 is a block diagram illustrating the conversion of full resolution image pixels to reduced resolution pixels according to one embodiment. In FIG. 6, full image 600 comprises m×n pixels. In this conversion, block 504 of method 500 converts full image 600 to reduced image 602, using a reduction k-factor of 4. In this embodiment, method 600 converts 4×4 pixel blocks to one pixel of reduced image 602. In one embodiment, block 504 of method 500 averages the full color pixel values in one 4×4 pixel block of full image 600 to generate the pixel of reduced image 602. In another embodiment, block 504 of method 500 averages one color channel of the 4×4 pixel block of full image 600 to generate one color channel for a corresponding pixel of reduced image 602. Because block 504 of method 500 does not require full color information to generate a depth map, block 504 of method 500 can work with a full color reduced image or a one color channel reduced image.

Because the reduced image has fewer pixels than the full image for the same sensor size, the reduced image pixel size is larger than the full image pixel size. For example, a ten megapixel sensor that has 5.49×5.49 micron pixel size changes to a 54.9×54.9 micron pixel size for a k=10 reduced image. Because the reduced image has a larger pixel size, the effective change in blur between two reduced resolution images is decreased. Hence, the amount of blur needed for method 500 to generate a depth map is larger for reduced images than for full images. Larger lens movement can lead to larger blur differences between the two images.

Figure 7:
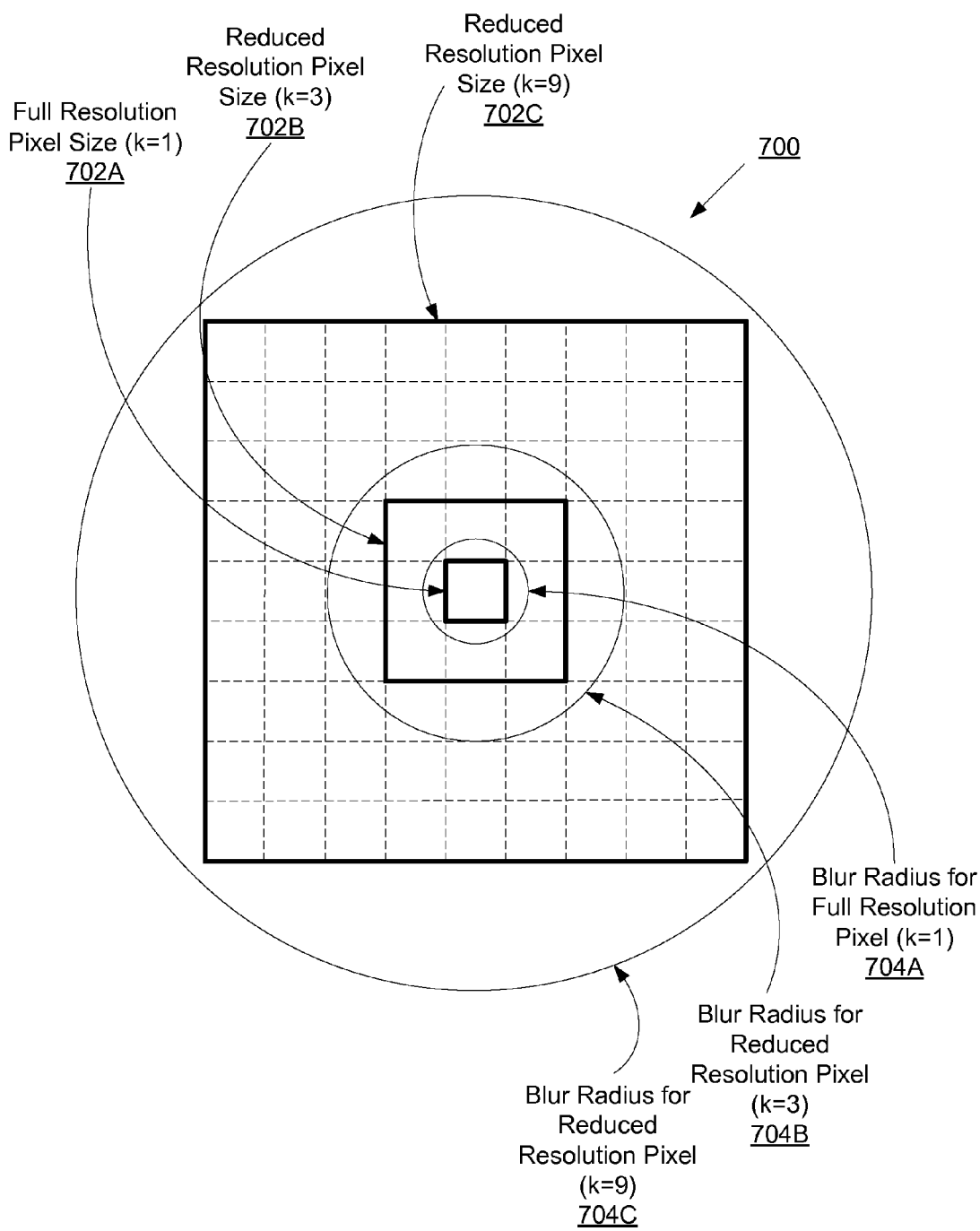
FIG. 7 is a block diagram illustrating one embodiment of different pixels sizes and associated blur radii for different full and reduced resolution images.

FIG. 7 is a block diagram illustrating different pixels sizes and associated blur radii for full and reduced resolution images according to one embodiment. In FIG. 7, three different pixels 702A-C are illustrated corresponding to full resolution pixel size (k=1) and two reduced resolution pixel sizes (k=3 and 9), respectively. Overlaid on pixels 702A-C is different blur radii 704A-C. Recall that system 400 uses two images with different blur information to generate the depth map. For a second image to have a detectable change in blur, the blurring radius should be bigger than the pixel size. For example, in FIG. 7, a blurring illustrated by blur radii 704A-C is larger than full resolution pixel size 702A. Thus, an image that has a blurring represented any of blur radii 704A-C can be used as the second image to generate a depth map. However, while blur radii 704B-C are larger than pixel size 702B, blur radius 702A is too small a blur change to be detected in an image with pixel size 702B. A smaller blurring is not detectable in an image with such a large pixel size.

FIG. 7 illustrates that the larger the pixel size used for the reduced resolution, the greater the blurring is needed for method 500 to detect the blur change. Blur change results from and/or other optics settings. See, for example, the lens position difference of two imaging optics settings in FIG. 2.

Figure 8:
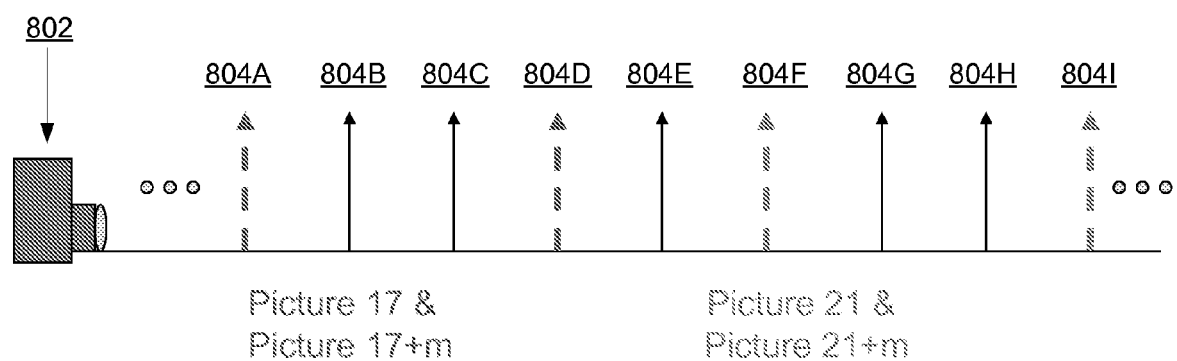
FIG. 8 is a graph illustrating one embodiment of focal depth image separation for different reduced resolution images.

Thus, the larger pixel size is proportional to the greater the distance a lens has to move for system 400 to detect an accurate blur difference between the first and second images. The change in lens position is graphically illustrated in FIG. 8. FIG. 8 is a graph illustrating one embodiment of focal depth image separation for different reduced resolution images. In FIG. 8, imaging system 802 can acquire a series of images 804A-I at different focal depths 804A-I determined by lens position. Images with larger focal depth separation have larger blur differentials. For example, images taken at focal depths 804A-B have a smaller blur differential than images taken at focal depths 804A and D. Thus, method 500 can utilize image pairs with small blur separation for reduced resolution images with relatively small pixel size (e.g., small k-factor), whereas method 500 would need images pairs with a larger blur separation for reduced resolution images with relatively large pixel size (e.g., large k-factor). For example, for reduced resolution images with k=10, method 500 would use image pairs 804A and D, or, 804A and E, etc., instead of image pairs 804A and B.

Returning to FIG. 5, at block 506, method 500 initializes counters N1 and N2 to −1, C1 and C2 to zero and error quantities Error1, Error1_new, Error2 and Error2_new to a large number, $10^{20}$. In one embodiment, N1 represents the number of iterations to convolve a first reduced image block into a corresponding second reduced image block while N2 represents the number of iterations to convolve a second reduced image block into a corresponding first reduced image block. C1 and C2 count every blur iteration that occurs. Once C1 or C2 reaches Cmax, the looping in that respective branch ends. In addition, method 500 sets the maximum number of iterations, Cmax, to Z.

Method 500 executes two processing loops (blocks 508A-514A and 508B-514B) for each pair of corresponding image blocks of the first and second reduced images. In one embodiment, method 500 uses the first loop to determine the blur difference between blocks of the first and second reduced image for blocks that are sharper in the first reduced image. Method 500 uses the second loop to determine blur difference for blocks that are sharper in the second reduced image. In one embodiment, method 500 executes the first and second loops for all the image block pairs. In another embodiment, method 500 executes either the first or second loop for all the image block pairs and executes the other loop for the block pairs that have iteration counts determined in the preceding loop equal to zero.

In the first loop, method 500 determines the match error between the first and second reduced image blocks. If the error is smaller than the previously stored value, counter N1 is incremented. In addition, the stored error value Error1 is also updated. Method 500 proceeds to 512a. If the match error is not smaller, method 500 proceeds to 512a. Method 500 blurs the first reduced image block at block 512a. In one embodiment, method 500 blurs the first reduced image block as described with reference to FIG. 4. Method 500 increments C1 by one at block 513a. At block 514a, method 500 determines if C1 is equal to Cmax. If so, execution proceeds to block 516. If C1 is less than Cmax, execution proceeds to 507a. Now, the first reduced image block is updated with the blurred block resulting from 512a while the second reduced image block remains unchanged.

In the second loop, method 500 determines the match error between the second and first reduced image blocks. If the error is smaller than the previously stored value, counter N2 is incremented. In addition, the stored error value Error2 is also updated. Method 500 proceeds to 512b. If the match error is not smaller, method 500 proceeds immediately to 512b. Method 500 blurs the second reduced image block at block 512b. In one embodiment, method 500 blurs the second reduced image block as described with reference to FIG. 4. Method 500 increments C2 by one at block 513b. At block 514b, method 500 determines if C2 is equal to Cmax. If so, execution proceeds to block 516. If C2 is less than Cmax, execution proceeds to 507b. The second reduced image block is updated with the blurred block resulting from 512b while the first reduced image block remains unchanged.

At block 516, method 500 determines the minimum non-zero value of N1 and N2. In one embodiment, method 500 determines the minimum as described with reference to FIG. 4, MIN 416. At block 518, method 500 calculates the depth map information for that image block from the iteration information generated at block 516. In one embodiment, method 500 determines the depth map information as described with reference to FIG. 4, MIN 416.

FIGS. 9-38 illustrate results that compare the full image depth map generation as described in conjunction with the prior art system 300 with the reduced resolution image depth map generation described in conjunction with system 400 and method 500.

Figure 9:
FIG. 9 illustrates one embodiment of a first full resolution test image.

FIG. 9 illustrates one embodiment of a first full resolution test image 900. FIG. 900 comprises mannequins 902, 904 and background 906. Image 900 was acquired with a focal length of 50 mm and aperture of F3.5. Mannequin 902 is 1.29 meters from the camera sensor and mannequin 904 is 1.74 meters away.

Figure 10:
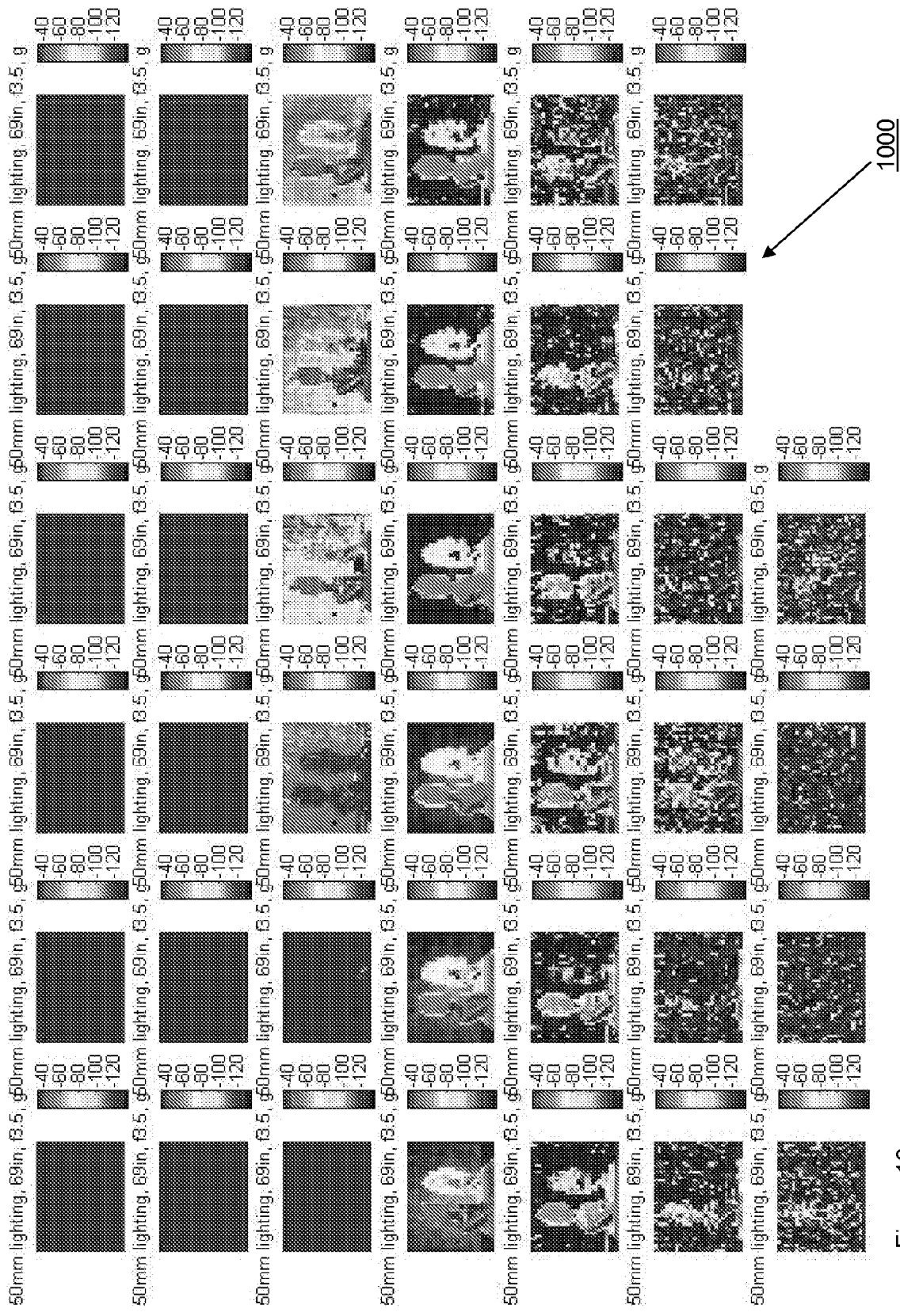
FIG. 10 illustrates one embodiment of a generated depth map for the first full resolution test image at differing lens positions.

FIGS. 10-14 illustrate generated depth maps, iteration maps, face specific templates, face specific error map, face specific average iterations and face specific average error for the full resolution test image in FIG. 9. FIG. 10 illustrates one embodiment of a series of generated depth maps 1000 for the first full resolution test image at differing focal depths. In this embodiment, the depth map was generated using the green channel. Each of the series of generated depth maps correspond to a depth map generated from a pair of images separated by a one depth of field. The different depth maps correspond to different lens positions are focused at different locations in the scene. FIG. 10 illustrates 40 computed depth maps, for monotonically changing lens focus positions. The first fourteen depth maps are outside the preset display range. The next fourteen depth maps show different depths for mannequin 902, 904 and background 906. The final twelve depth maps start to lose the depth accuracy for mannequins 902, 904 and background 906 and, thus, show error in the depth maps.

Figure 11:
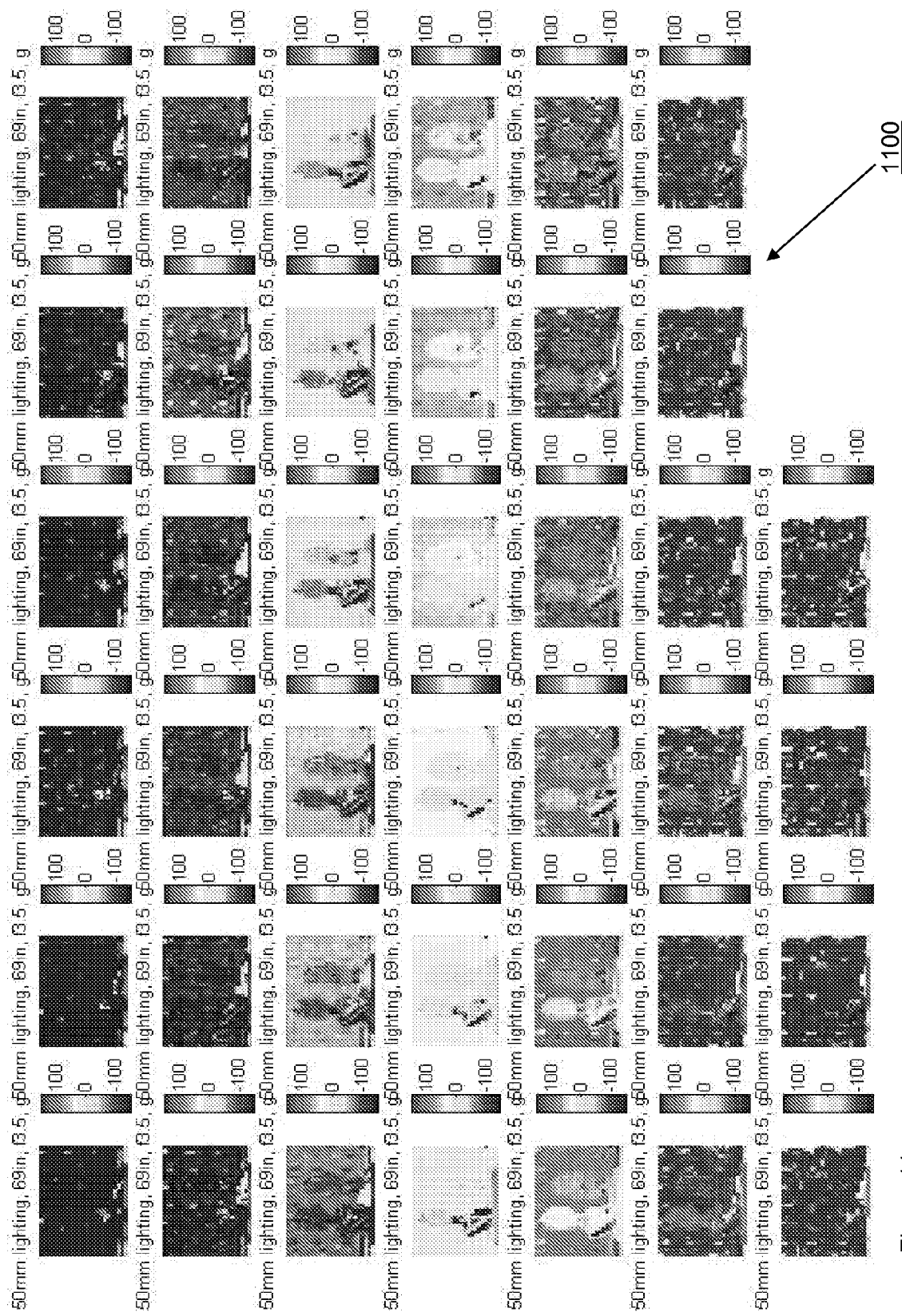
FIG. 11 illustrates one embodiment of an iteration map for the generated image map at differing lens positions.

FIG. 11 illustrates one embodiment of an iteration map 1100 for the generated depth maps at differing focal depths. Iteration map 1100 illustrates the number of iterations required to calculate the change in blur at each location in the image and at differing focal depths. In this embodiment, the depth map was generated using the green channel.

Figure 12:
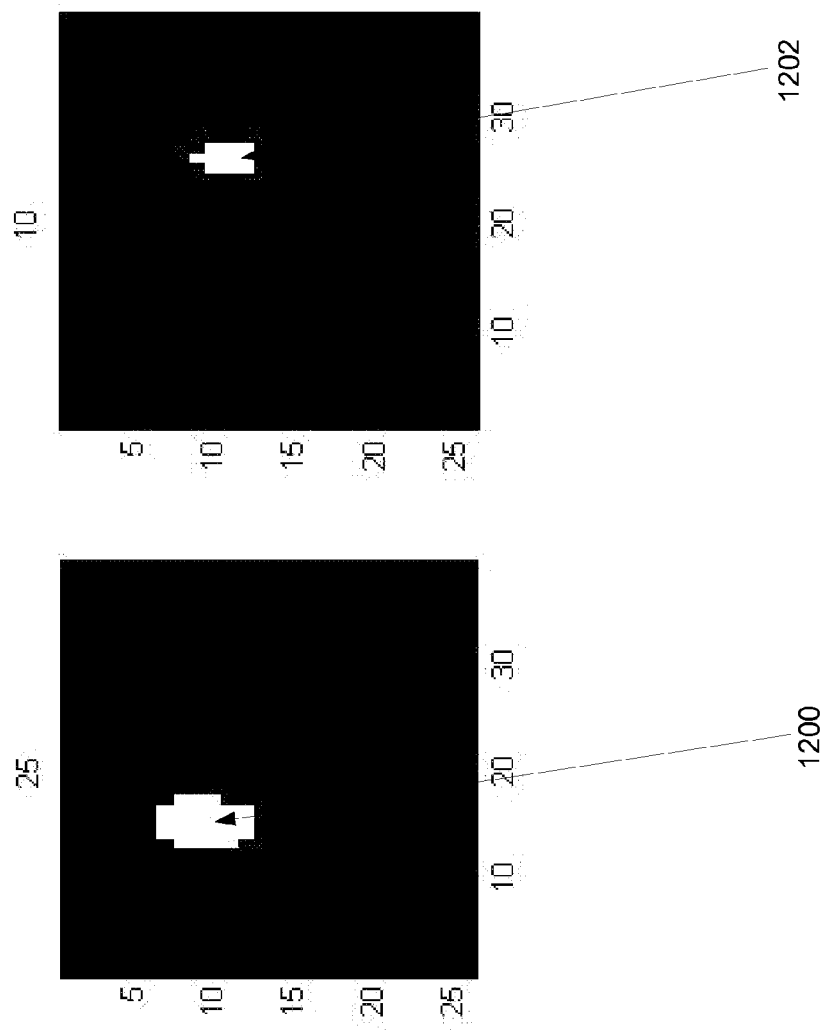
FIG. 12 illustrates one embodiment of a face specific template of the first full resolution test image.

FIG. 12 illustrates one embodiment of face specific templates 1202, 1204 of the first full resolution test image. These templates are empirically determined and restrict the analysis of the error to the mannequin 902, 904 faces.

Figure 13:
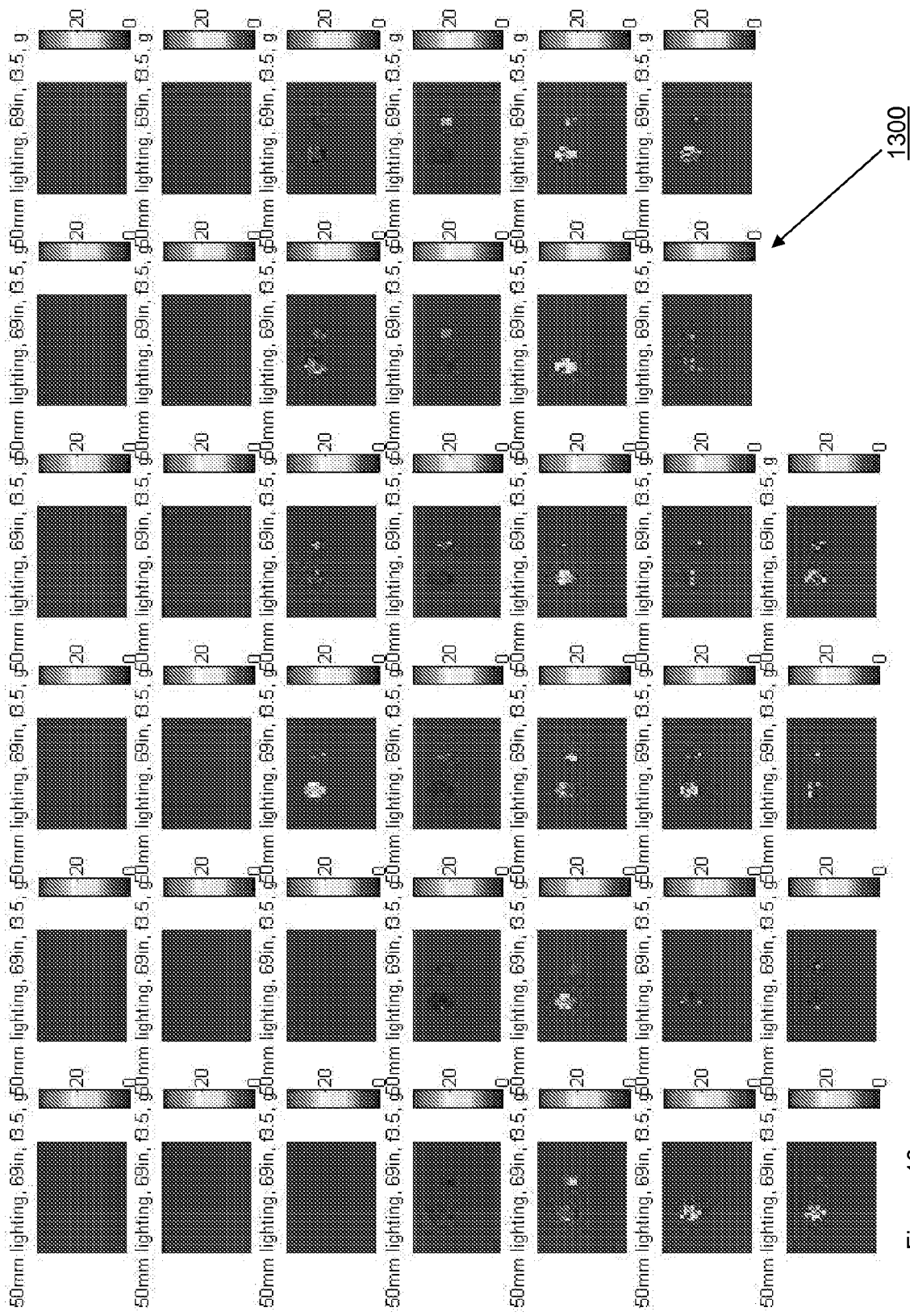
FIG. 13 illustrates one embodiment of a face specific error map of the first full resolution test image.

FIG. 13 illustrates one embodiment of a face specific error map 1300 of the first full resolution test image. Error map 1300 illustrates the percent error between the calculated distance and the actual distance for the mannequin 902, 904 faces. There is large error in the depth for the mannequin 902, 904 faces for the initial fourteen face specific error maps. The middle fourteen face specific error maps show little error, as expected from above. More error is shown in the last twelve face specific error maps.

Figure 14:
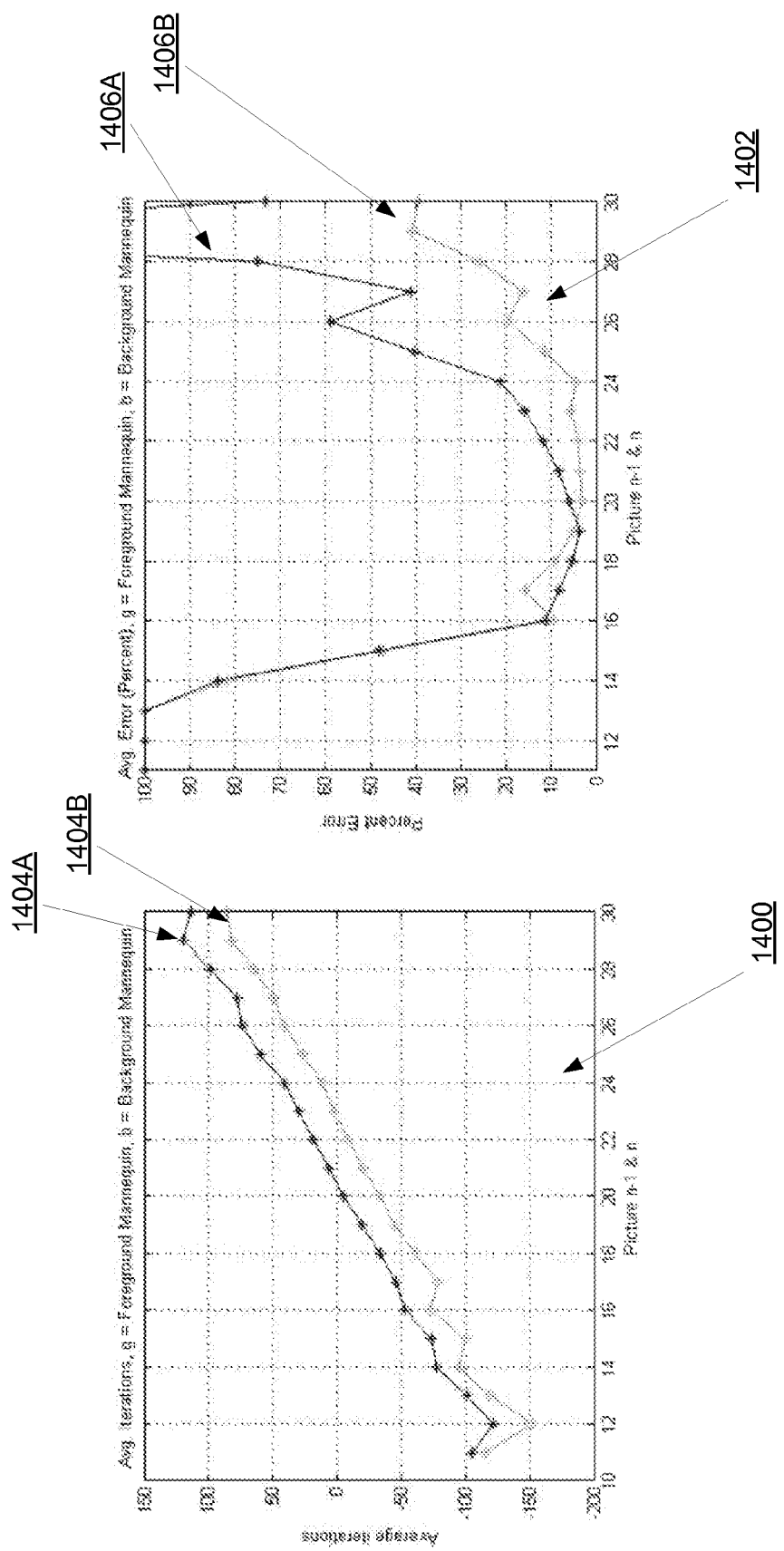
FIG. 14 illustrates graphs of average iterations and average error in generating the depth map for the face specific first full resolution test image.

FIG. 14 illustrates graphs of average iterations 1400 and average error 1402 in generating the face specific depth map for the face specific first full resolution test image. In FIG. 14, graph 1400 illustrates the number of iterations needed to obtain the depth map for a particular picture. Graphs 1404A-B represent number of iterations needed for mannequin 902 and 904, respectively.

Graphs 1406A-B illustrate the error in the depth map for mannequins 902, 904. As noted before, depth maps based on pictures early and late in the picture sequence (e.g., greater than picture 15 and less than picture 28), tend to show large error. The middle sequence of picture has a relatively low error percentage. In addition, the error for the near mannequin 902 is generally larger than for the rear mannequin 904.

Figure 15:
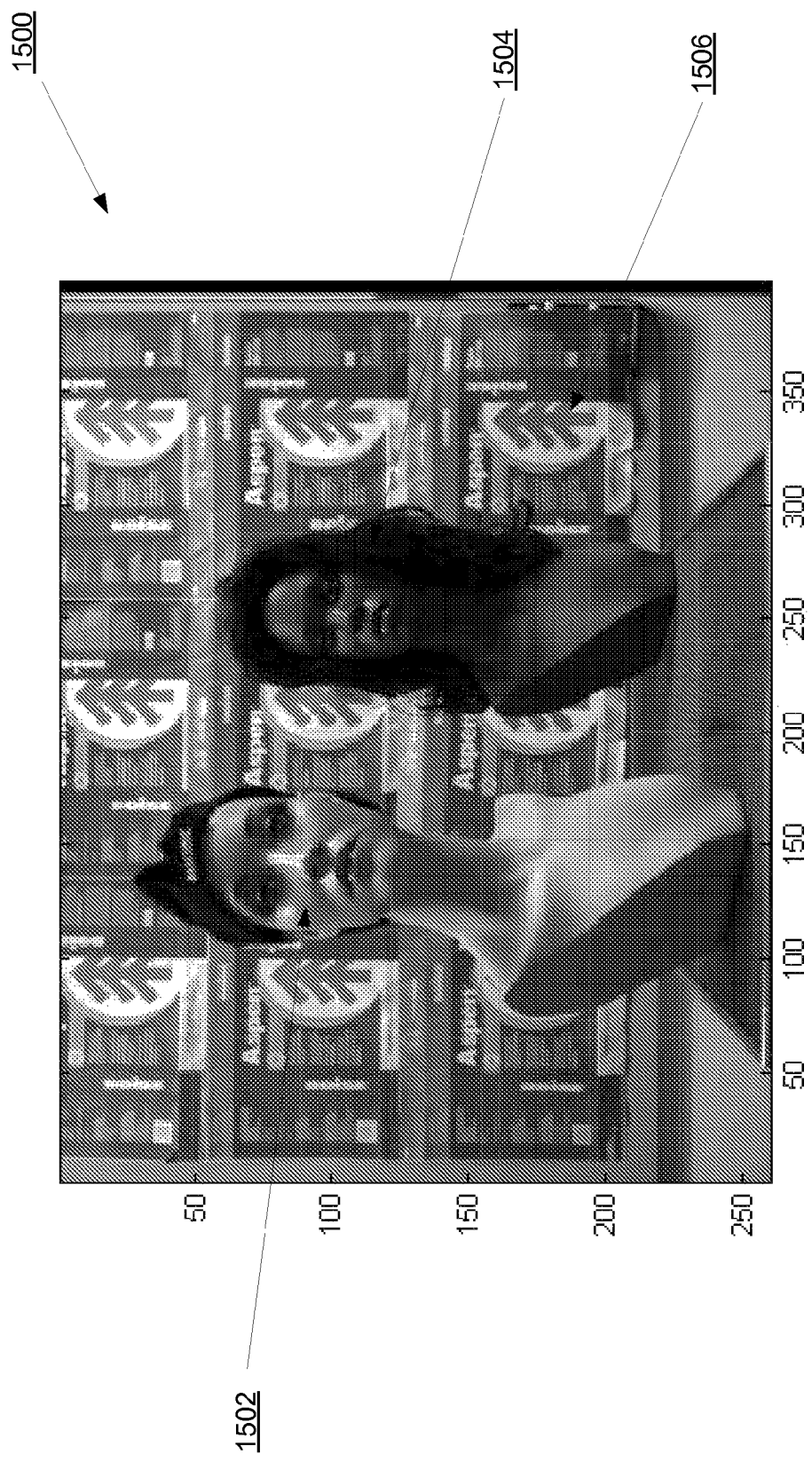
FIG. 15 illustrates one embodiment of a first reduced resolution test image.

FIG. 15 illustrates one embodiment of a first reduced resolution test image 1500 and is the same image as in FIG. 9, except the resolution is a quarter video graphics array resolution of 320×240 pixels (k=16 as compared with image 900). FIG. 1500 comprises mannequins 1502, 1504 and background 1506. Image 1500 was acquired with a focal length of 50 mm and aperture of F3.5. Mannequin 1502 is 1.29 meters from the camera sensor and mannequin 1504 is 1.74 meters away.

Figure 16:
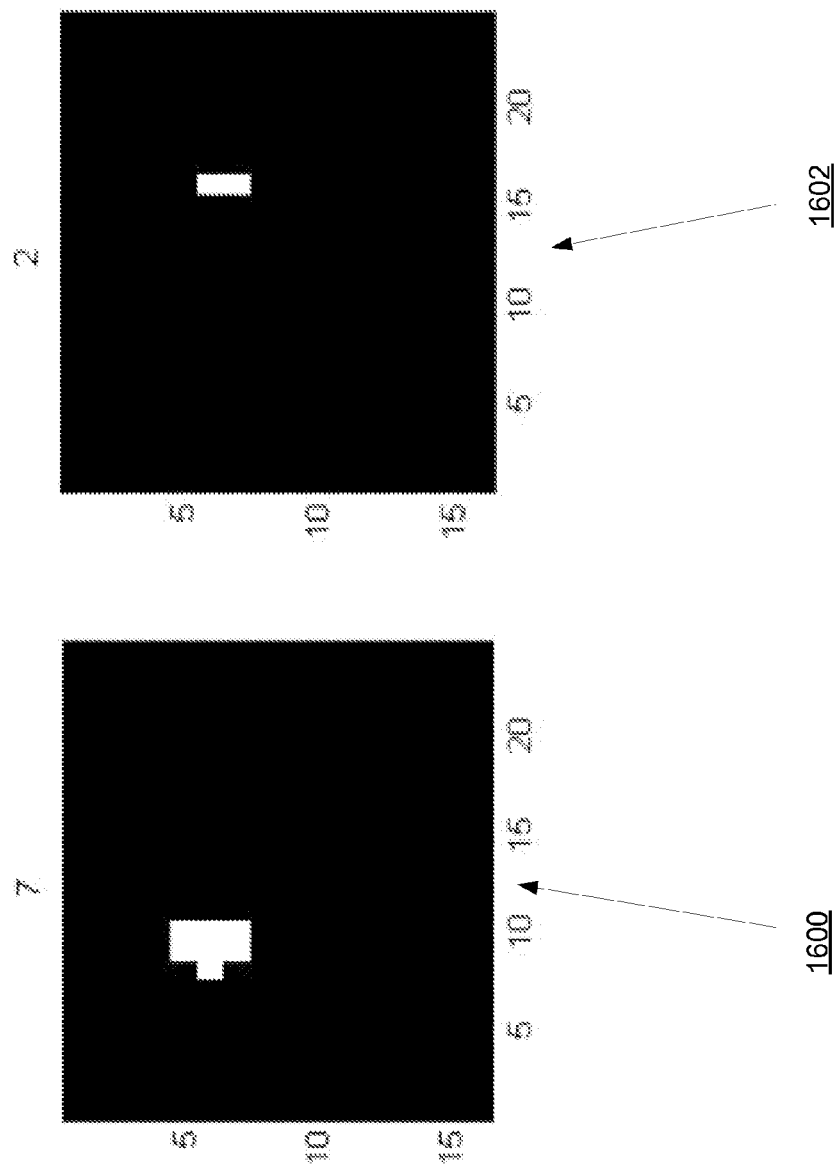
FIG. 16 illustrates one embodiment of a face specific template of the first reduced resolution test image.
Figure 17:
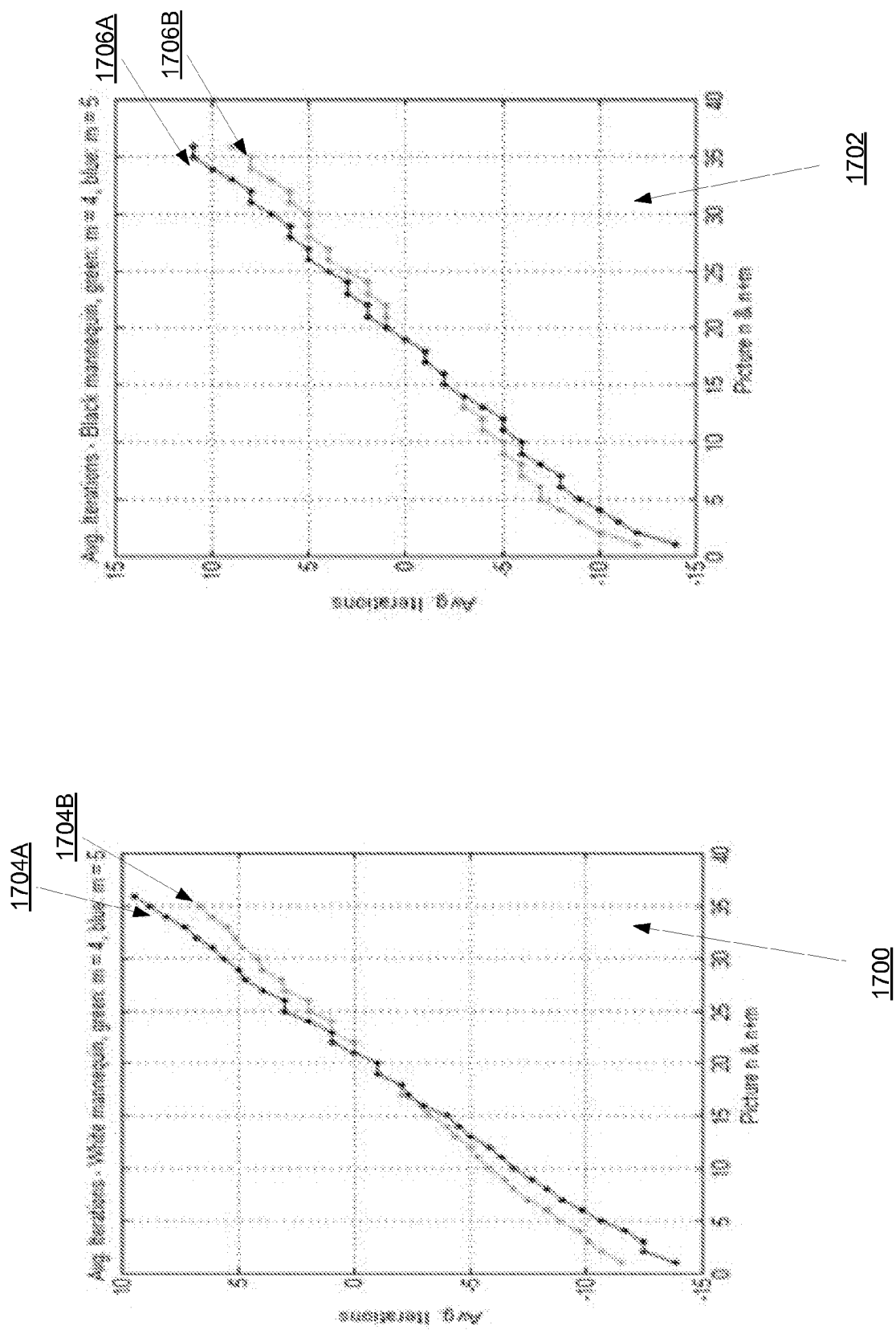
FIG. 17 illustrates graphs of average iterations in generating the depth map for the first face specific reduced resolution test image.
Figure 18:
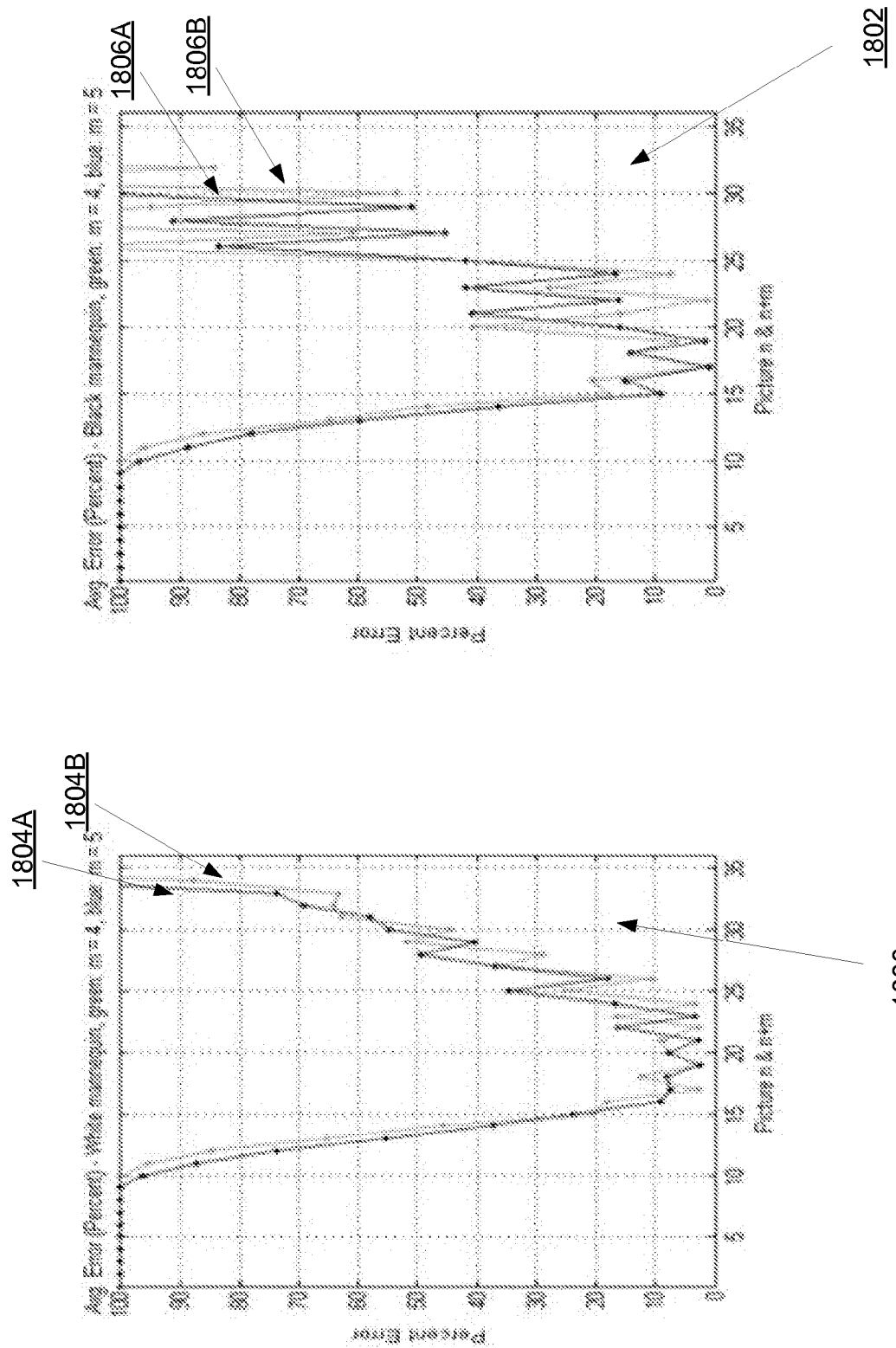
FIG. 18 illustrates graphs of average error in generating the depth map for the first face specific reduced resolution test image.

FIGS. 16-18 illustrate face specific template, face specific average iterations and face specific average error for the reduced resolution image in FIG. 15. FIG. 16 illustrates one embodiment of a face specific template 1602, 1604 of the first reduced resolution test image. These templates are empirically determined and restrict the analysis of the error to the mannequin 1502, 1504 faces.

FIG. 17 illustrates graphs of face specific average iterations 1700-2 in generating the depth map for the face specific first reduced resolution test image. Graph 1700 represents convergence for mannequin 1502 and comprises curves 1704A-B. Graph 1702 represents convergence for mannequin 1504 and graph 1702 comprises curves 1706A-B. Curves 1704A-B represent the number of iterations needed for convergence for the depth map for image pairs separated by four and five depths of field (at full resolution), respectively. Curves 1704A-B and 1706A-B tend to track each other and give comparable results. In addition, there is not a wide variation in the number of iterations needed to converge as was demonstrated in the full image case (see, e.g., graph 1400 in FIG. 14). For example, the range in iterations needed as compared with the average is approximately −15 to +10. Curves 1706A-B demonstrate similar results.

FIG. 18 illustrates graphs of face specific average error 1800-2 in generating the depth map for the first reduced resolution test image. Graph 1800 represents error for mannequin 1502 and comprises curves 1804A-B. Graph 1802 represents error for mannequin 1504 and graph 1802 comprises curves 1806A-B. Curves 1804A-B represent the error in the depth map for image pairs separated by four and five depths of field (at full resolution), respectively. Curves 1806A-B are similar. Curves 1804A-B and 1806A-B tend to track each other and give comparable results. Curves 1806A-B demonstrate similar results.

Figure 19:
FIG. 19 illustrates one embodiment of a second full resolution test image.

FIG. 19 illustrates one embodiment of a second full resolution test image 1900. FIG. 1900 comprises mannequins 1902, 1904 and background 1906. Image 1900 was acquired with a focal depth of 120 mm and aperture of F4.8. Mannequin 902 is 3.43 meters from the camera sensor and mannequin 904 is 2.82 meters away.

Figure 20:
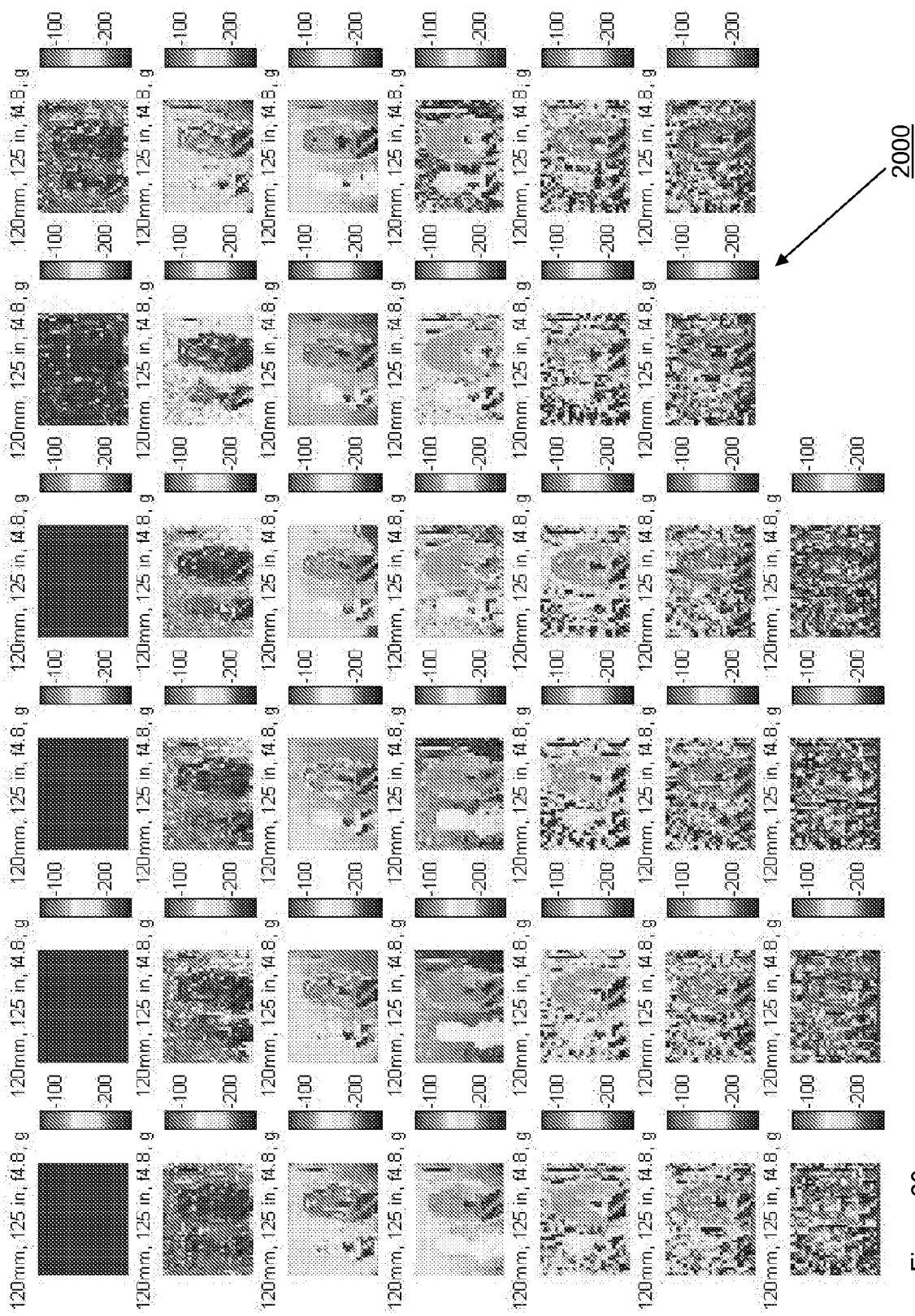
FIG. 20 illustrates one embodiment of a generated depth map for the second full resolution test image at differing lens positions.

FIGS. 20-24 illustrate generated depth maps, iteration map, face specific templates, face specific error map, face specific average iterations and face specific average error for the full resolution test image in FIG. 19. FIG. 20 illustrates one embodiment of a generated depth map 2000 for the second full resolution test image at differing focal depths. In this embodiment, the depth map was generated using the green channel. As in FIG. 20, the different depth maps correspond to different initial lens positions. Each of the series of generated depth maps correspond to a depth map generated from a pair of images separated by a small focal depth (e.g., an image a particular focal depth and a second image at the next focal depth). The first five depth maps show little depth change. Because there is little depth variation in these initial depth maps, these depth maps have errors. The next twenty-five depth maps different depths for mannequin 1902, 1904 and background 1906. The final ten depth maps start to lose the differing depths for mannequins 1902, 1904 and background 1906 and, thus, show error in the depth maps.

Figure 21:
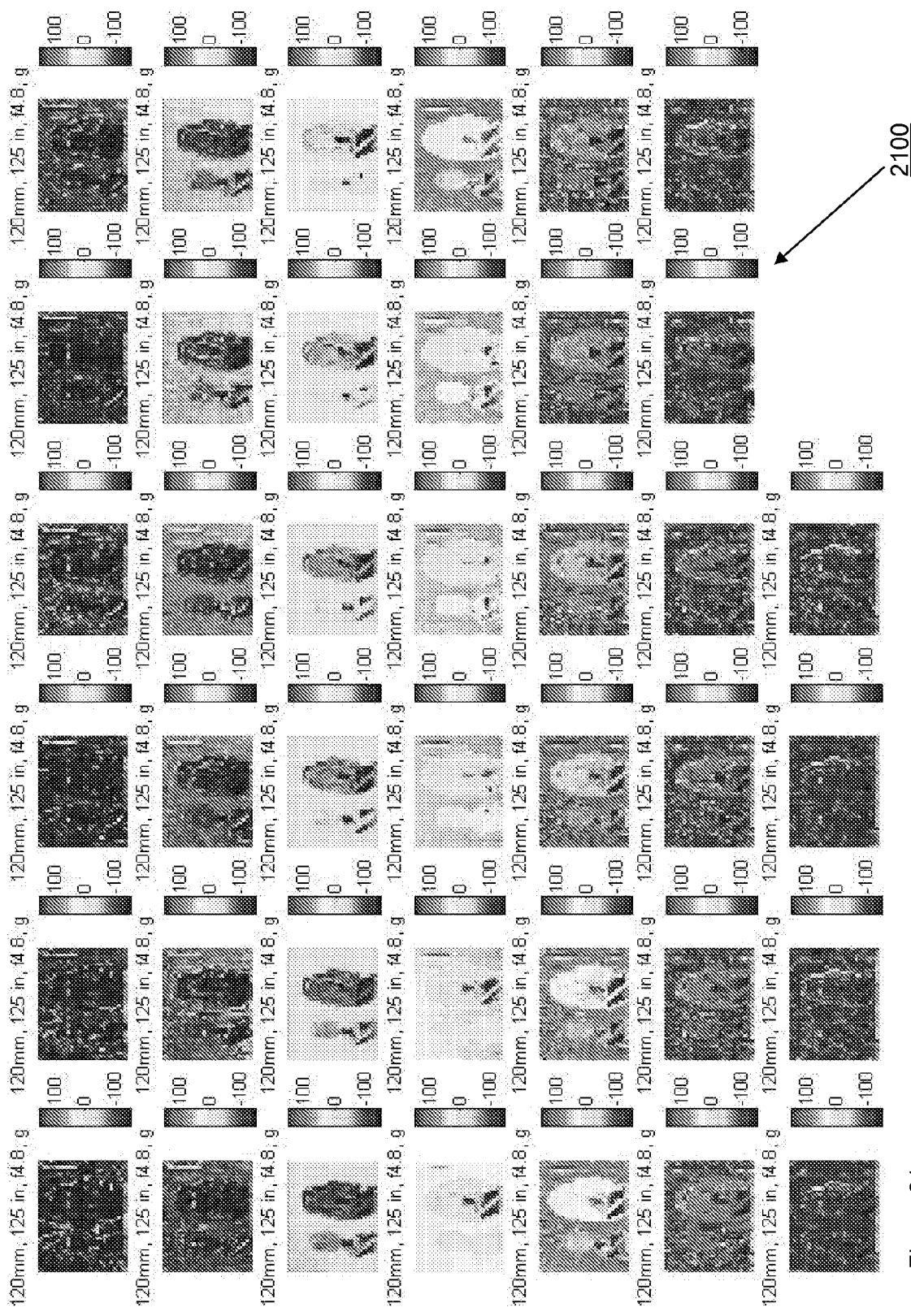
FIG. 21 illustrates one embodiment of an iteration map for the generated image map at differing lens positions.

FIG. 21 illustrates one embodiment of an iteration map 2100 for the generated image map at differing focal depths. In this embodiment, the depth map was generated using the green channel.

Figure 22:
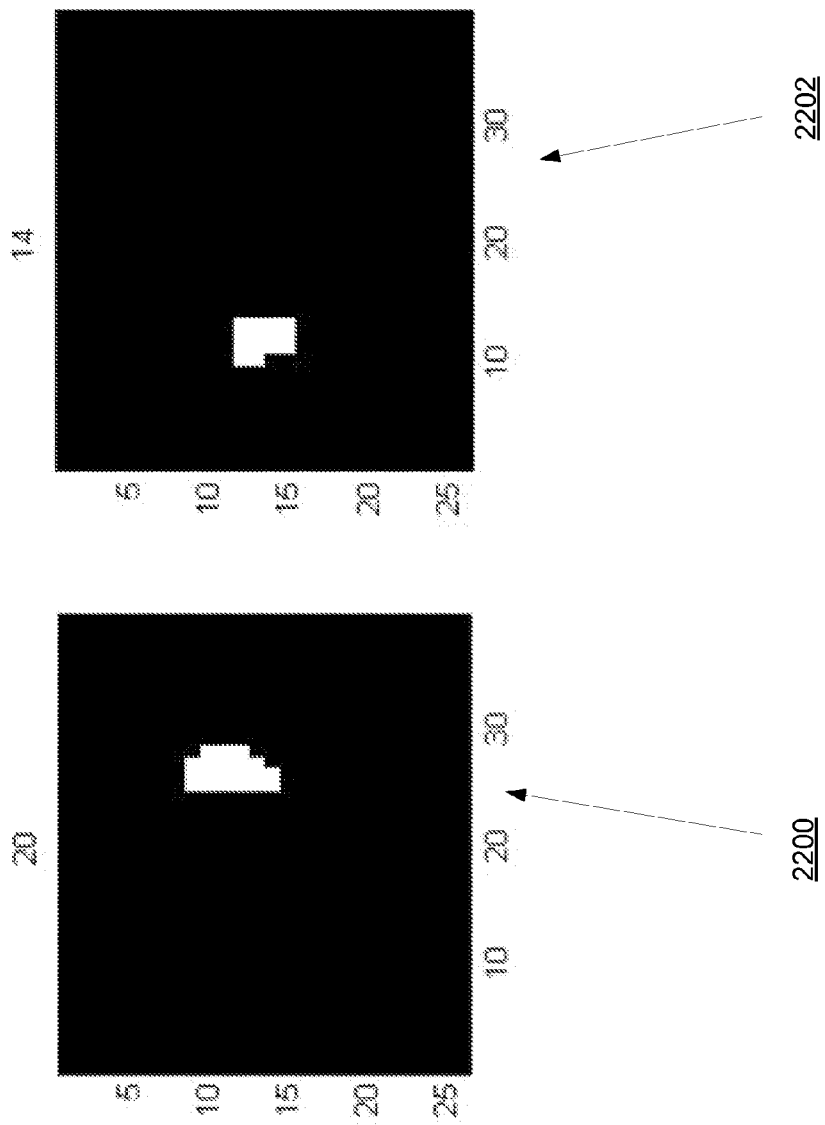
FIG. 22 illustrates one embodiment of a face specific template of the second full resolution test image.

FIG. 22 illustrates one embodiment of a face specific template 2200 of the second full resolution test image. These templates are empirically generated and restrict the analysis of the error to the mannequin 1902, 1904 faces.

Figure 23:
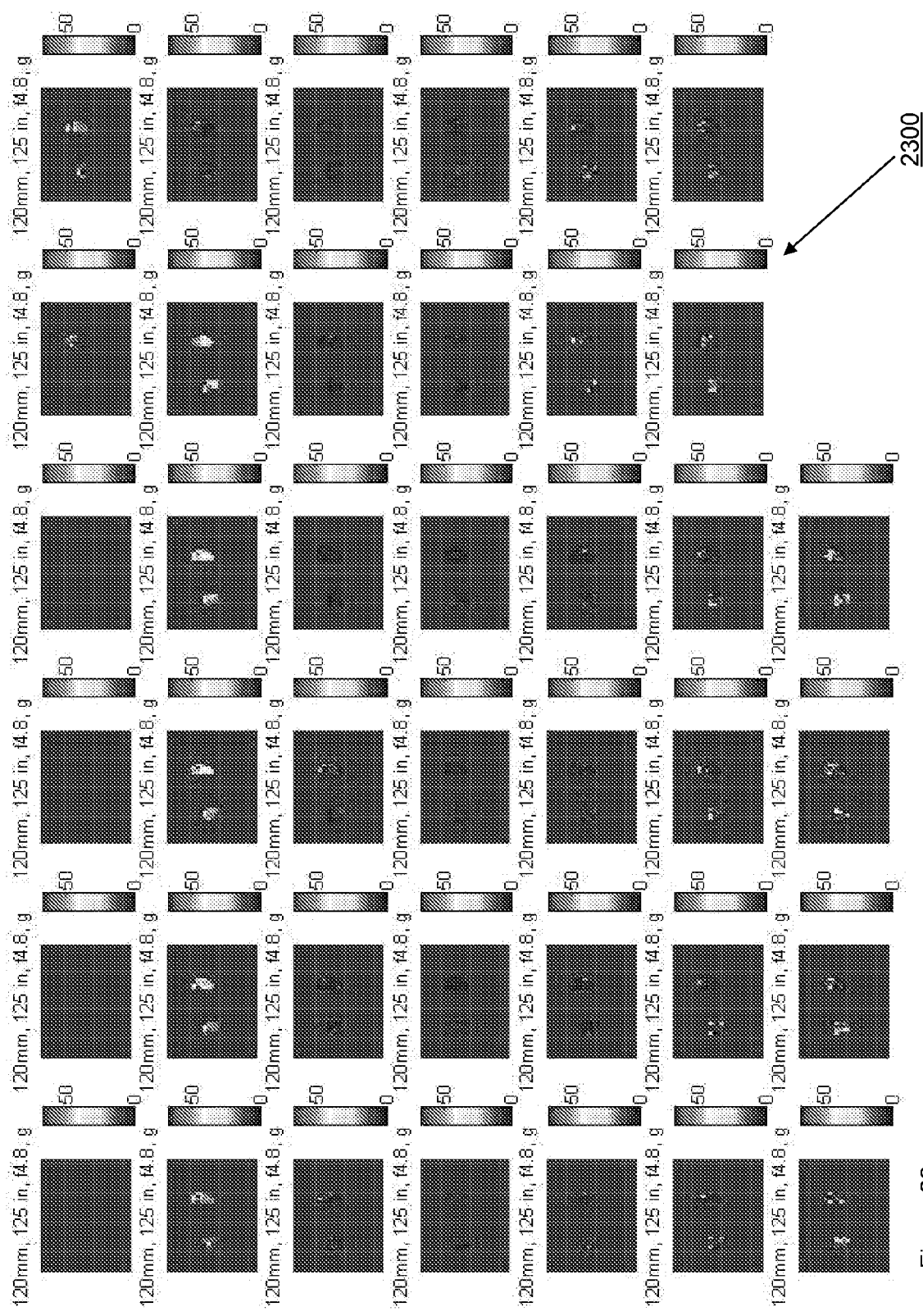
FIG. 23 illustrates one embodiment of a face specific error map of the second full resolution test image.

FIG. 23 illustrates one embodiment of a face specific error map 2300 of the second full resolution test image. As expected, there is large error in the depth for the mannequin 1902, 1904 faces for the initial five face specific error maps. The middle twenty-five face specific error maps show little error, as expected from above. More error is shown in the last ten face specific error maps.

Figure 24:
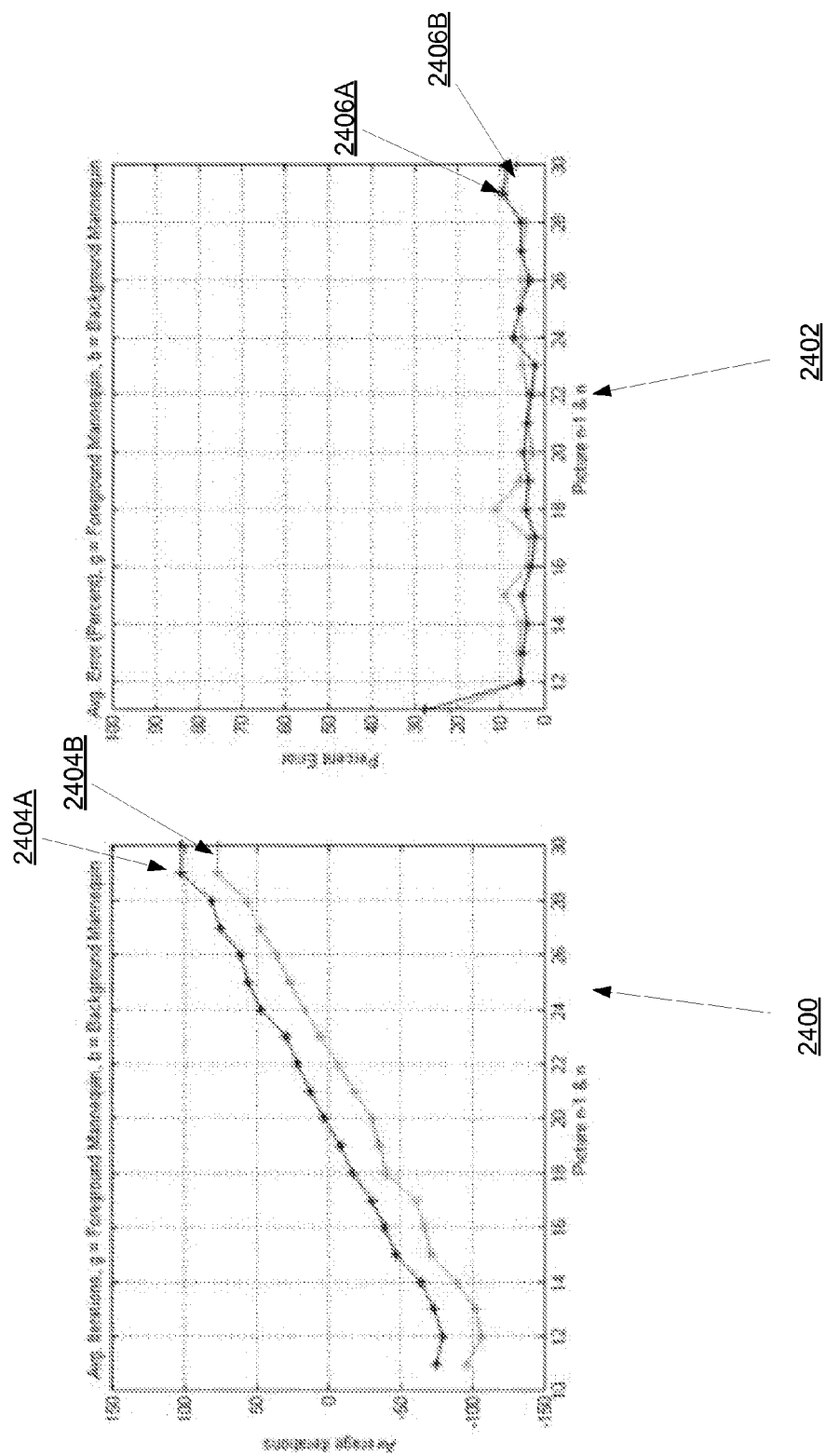
FIG. 24 illustrates graphs of average iterations and average error in generating the depth map for the face specific second full resolution test image.

FIG. 24 illustrates graphs of face specific average iterations 2402 and average error 2404 in generating the depth map for the face specific second full resolution test image. In FIG. 24, graph 2400 illustrates the number of iterations needed to obtain the depth map for a particular picture. Curves 2404A-B represent number of iterations needed for mannequin 902 and 904, respectively.

Curves 2406A-B illustrate the error in the depth map for mannequins 902, 904. As noted before, depth maps based on pictures early and late in the picture sequence (e.g., less than picture 12 and greater than picture 30), tend to show larger error. The middle sequence of picture has a relatively low error percentage. In addition, for the near mannequin 902 is larger than for the rear mannequin 904.

Figure 25:
FIG. 25 illustrates one embodiment of a second reduced resolution test image.

FIG. 25 illustrates one embodiment of the second reduced resolution test image 2500 and is the same image as in FIG. 19, except the resolution is quarter video graphics array resolution of 320×240 pixels (k=26 as compared with image 900). FIG. 2500 comprises mannequins 2502, 2504 and background 2506. Image 2500 was acquired with a focal length of 120 mm and aperture of F4.8. Mannequin 2502 is 3.43 meters from the camera sensor and mannequin 2504 is 2.82 meters away.

Figure 26:
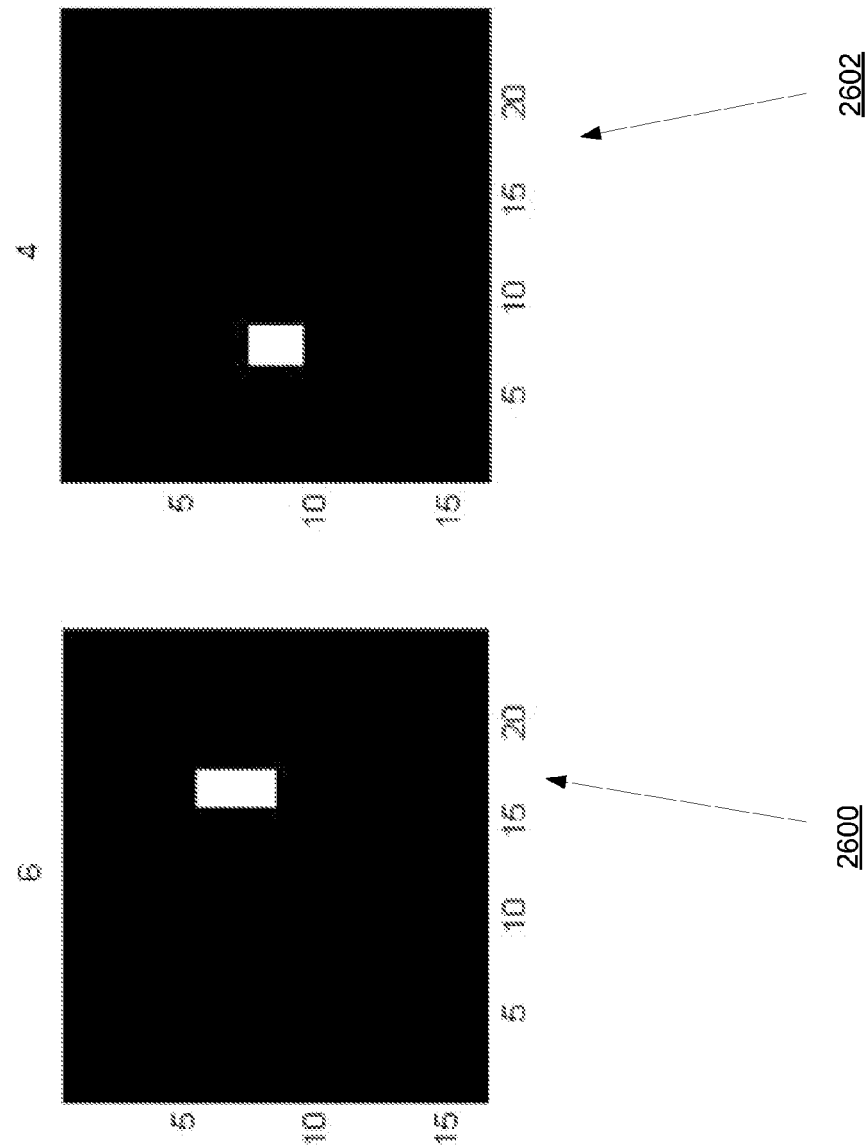
FIG. 26 illustrates one embodiment of a face specific template of the second reduced resolution test image.
Figure 27:
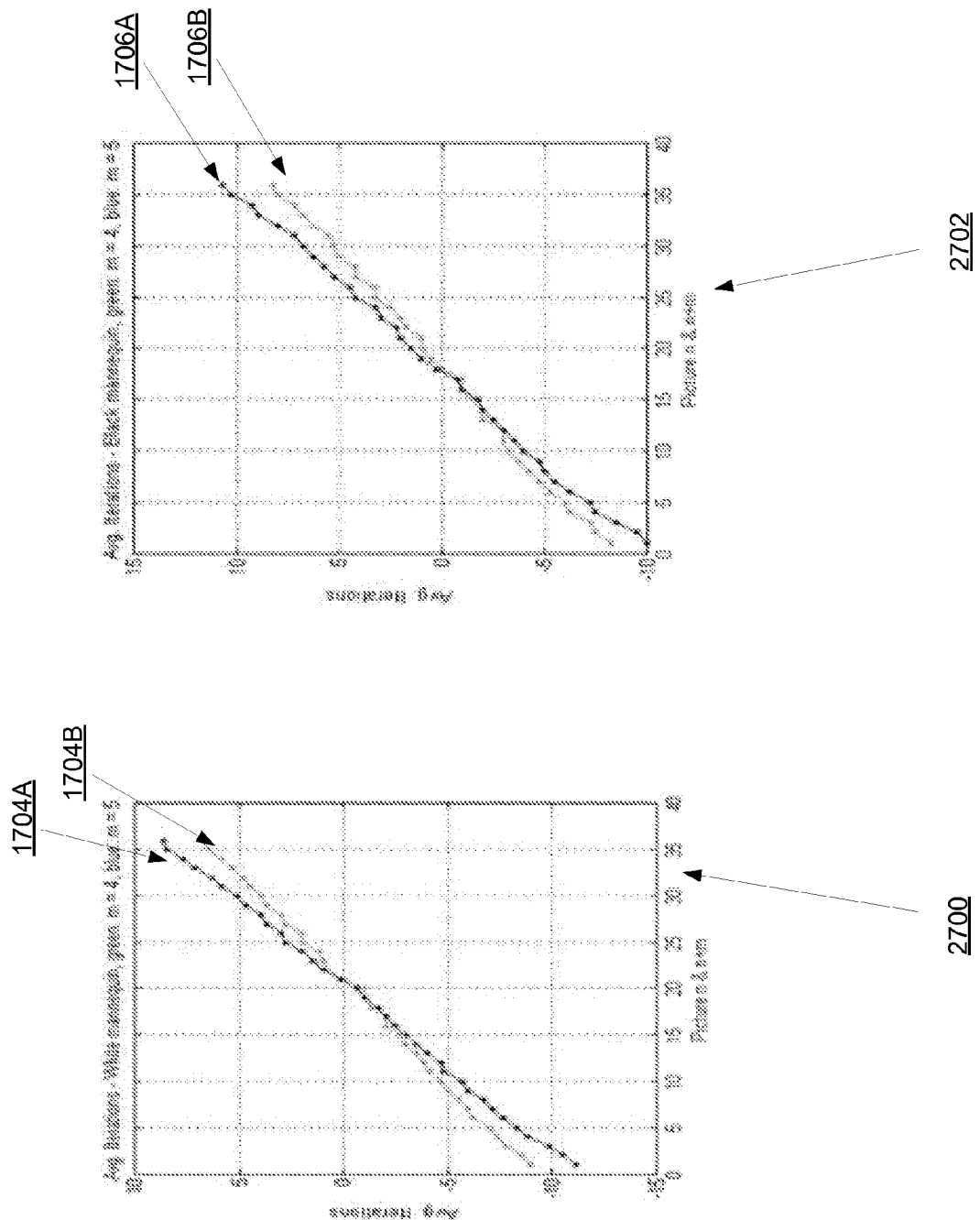
FIG. 27 illustrates graphs of average iterations in generating the depth map for the face specific second reduced resolution test image.
Figure 28:
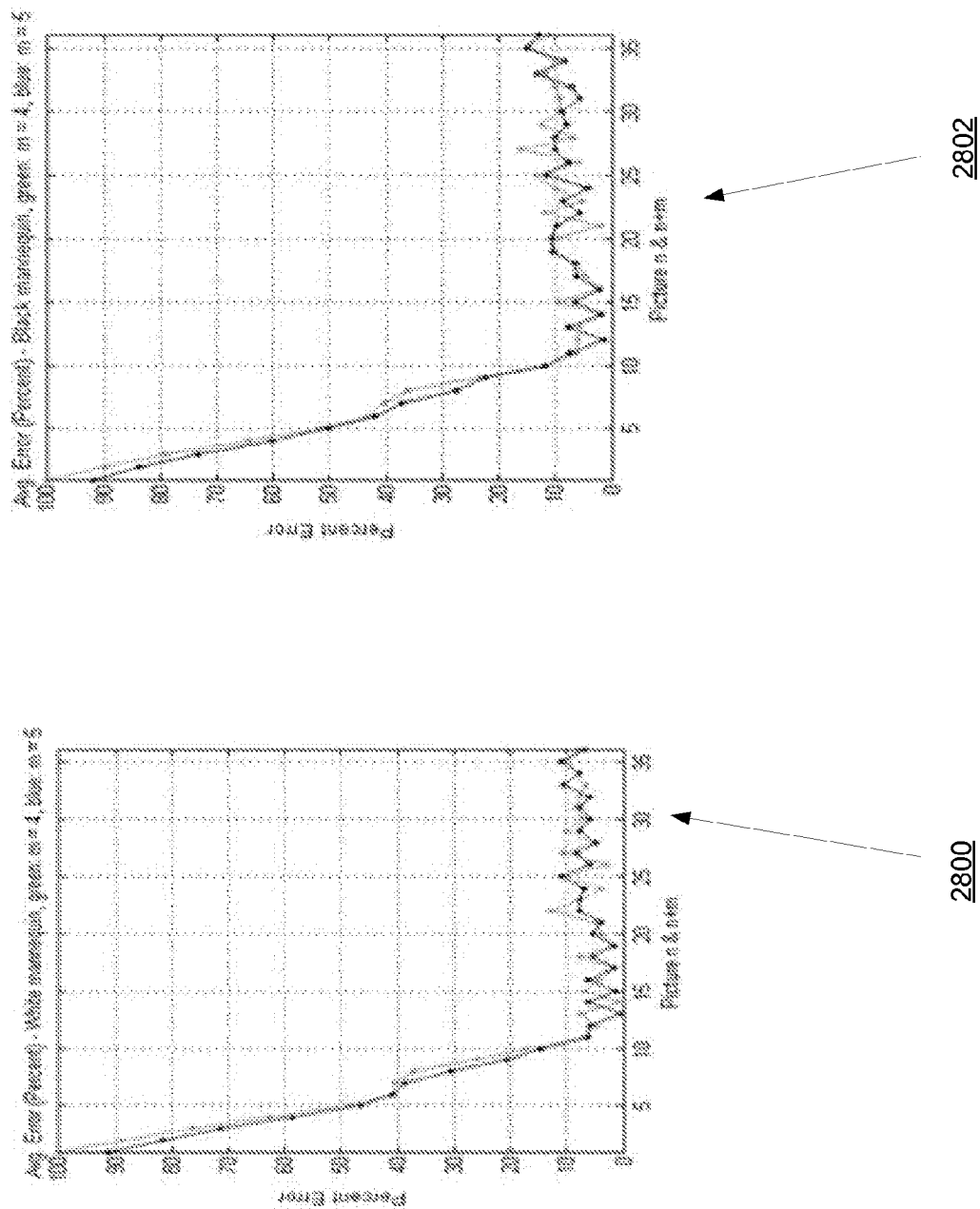
FIG. 28 illustrates graphs of average error in generating the depth map for the face specific second reduced resolution test image.

FIGS. 26-28 illustrate face specific template, face specific average iterations and face specific average error for the reduced resolution image in FIG. 25. FIG. 26 illustrates one embodiment of a face specific template 2600 of the second reduced resolution test image. These templates are empirically generated and restrict the analysis of the error to the mannequin 2502, 2504 faces.

FIG. 27 illustrates graphs of face specific average iterations 2700 in generating the depth map for the face specific second reduced resolution test image. Graph 2700 represents convergence for mannequin 2502 and comprises curves 2704A-B. Graph 2702 represents convergence for mannequin 2504 and graph 2702 comprises curves 2706A-B. Curves 2704A-B represent the number of iterations needed for convergence for the depth map for image pairs separated by four and five depth of fields (at full resolution), respectively. Curves 2704A-B and 2706A-B tend to track each other and give comparable results. In addition, there is not a wide variation in the number of iterations needed to converge as was demonstrated in the full image case (see, e.g., graph 2400 in FIG. 24). For example, the range in iterations needed as compared with the average is approximately −15 to +10. Curves 2706A-B demonstrate similar results.

FIG. 28 illustrates graphs of face specific average error 2800 in generating the depth map for the face specific second reduced resolution test image. Graph 2800 represents error for mannequin 2502 and comprises curves 2804A-B. Graph 2802 represents error for mannequin 2504 and graph 2802 comprises curves 2806A-B. Curves 2804A-B represent the error in the depth map for image pairs separated by four and five depth of fields (at full resolution), respectively. Curves 2806A-B are similar. Curves 2804A-B and 2806A-B tend to track each other and give comparable results. Curves 2806A-B demonstrate similar results.

Figure 29:
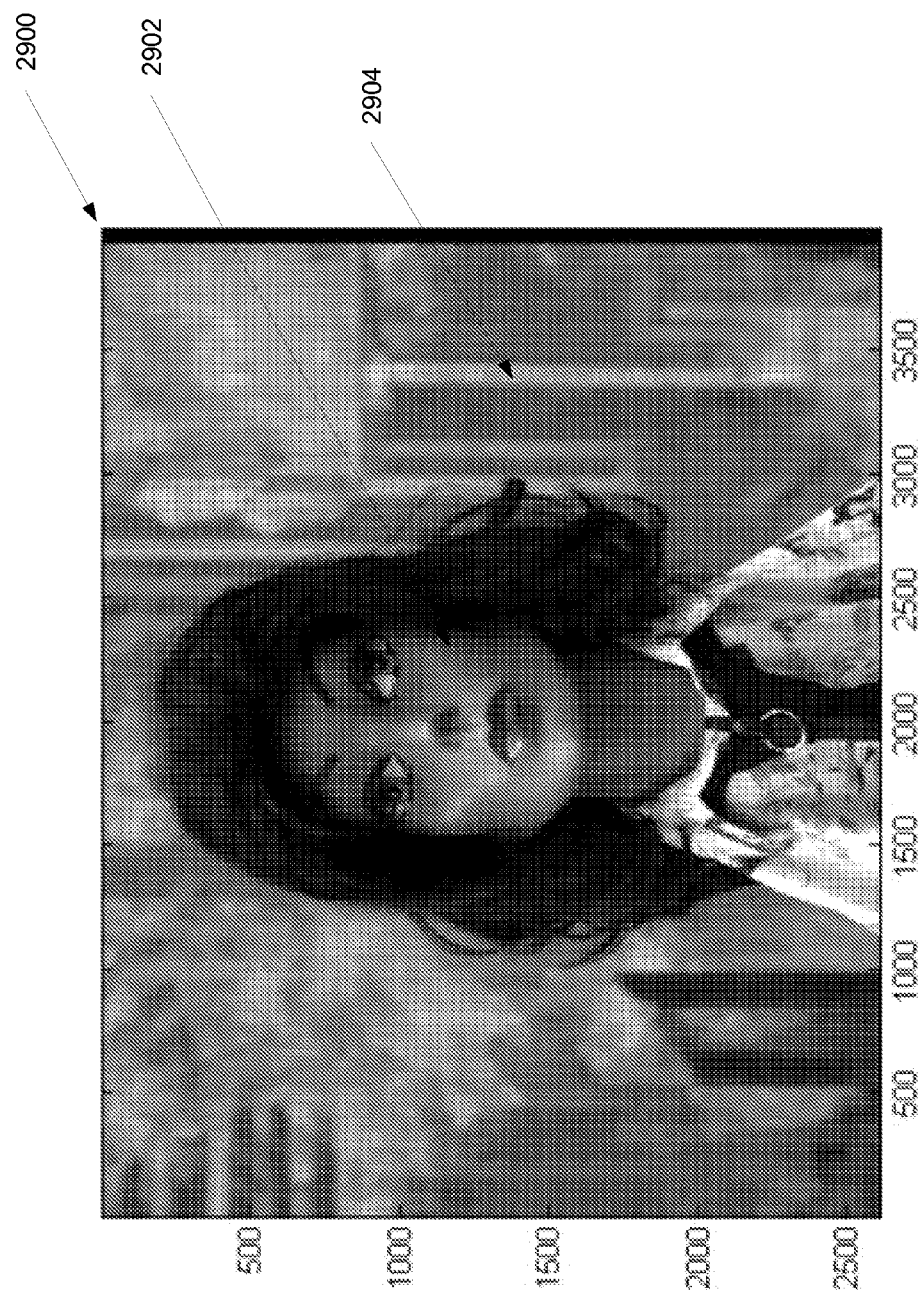
FIG. 29 illustrates one embodiment of a third full resolution test image.

FIG. 29 illustrates one embodiment of a third full resolution test image 2900. FIG. 2900 comprises mannequin 2902 and background 2904. Image 2900 was acquired with a focal depth of 120 mm and aperture of F4.8. Mannequin 902 is 1.83 meters from the camera sensor.

Figure 30:
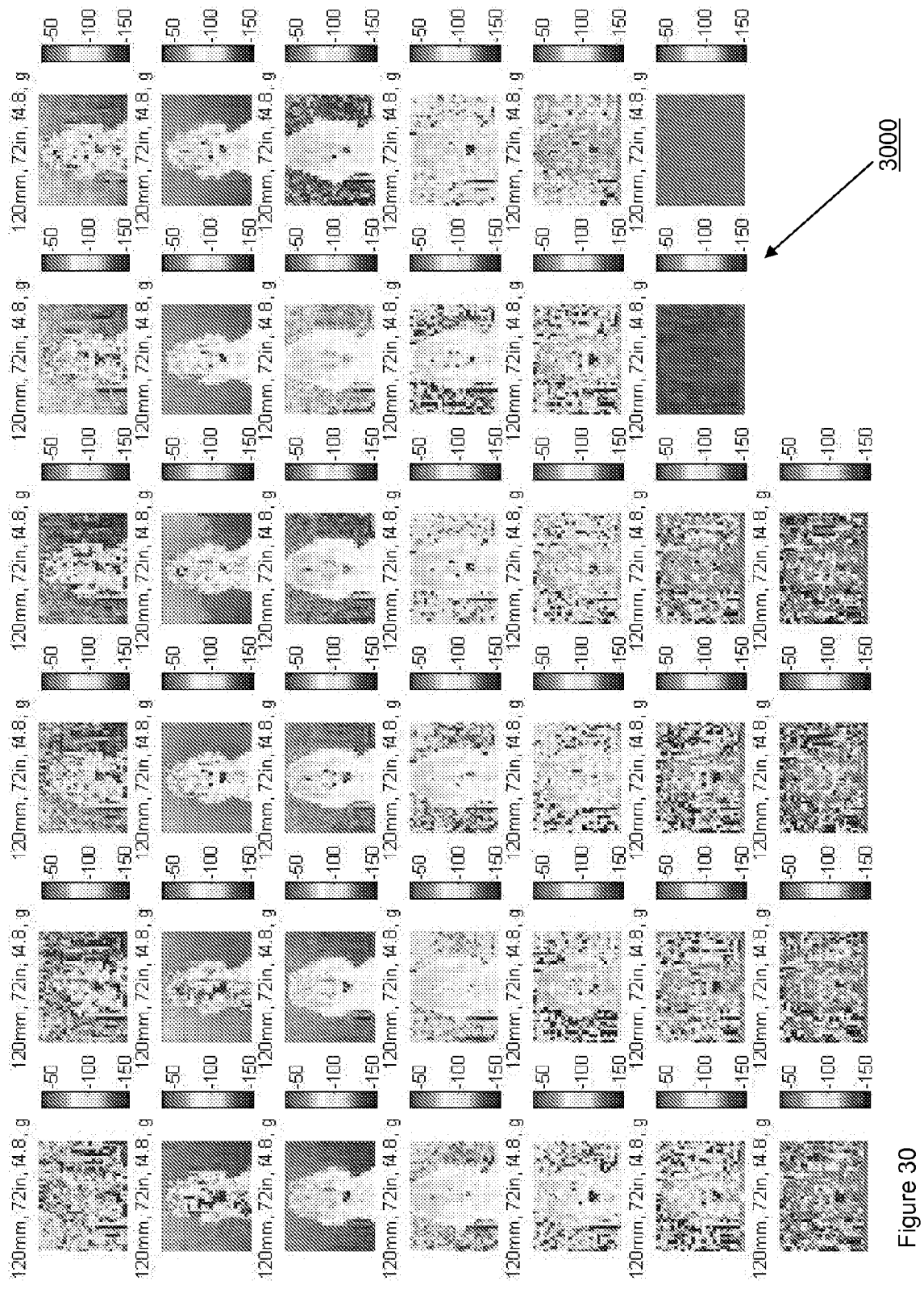
FIG. 30 illustrates one embodiment of a generated depth map for the third full resolution test image at differing lens positions.

FIGS. 30-34 illustrate generated depth maps, iteration map, face specific templates, face specific error map, face specific average iterations and face specific average error for the full resolution test image in FIG. 29. FIG. 30 illustrates one embodiment of a generated depth map 3000 for the third full resolution test image at differing focal depths. Each of the series of generated depth maps correspond to a depth map generated from a pair of images separated by a small focal depth (e.g., an image a particular focal depth and a second image at the next focal depth). The first four depth maps show noise in the depth map, which indicate errors. The next twenty-four depth maps different depths for mannequin 2902 and background 2904. The final twelve depth maps start to lose the differing depths for mannequins 2902 and background 2904 and, thus, show error in the depth maps.

Figure 31:
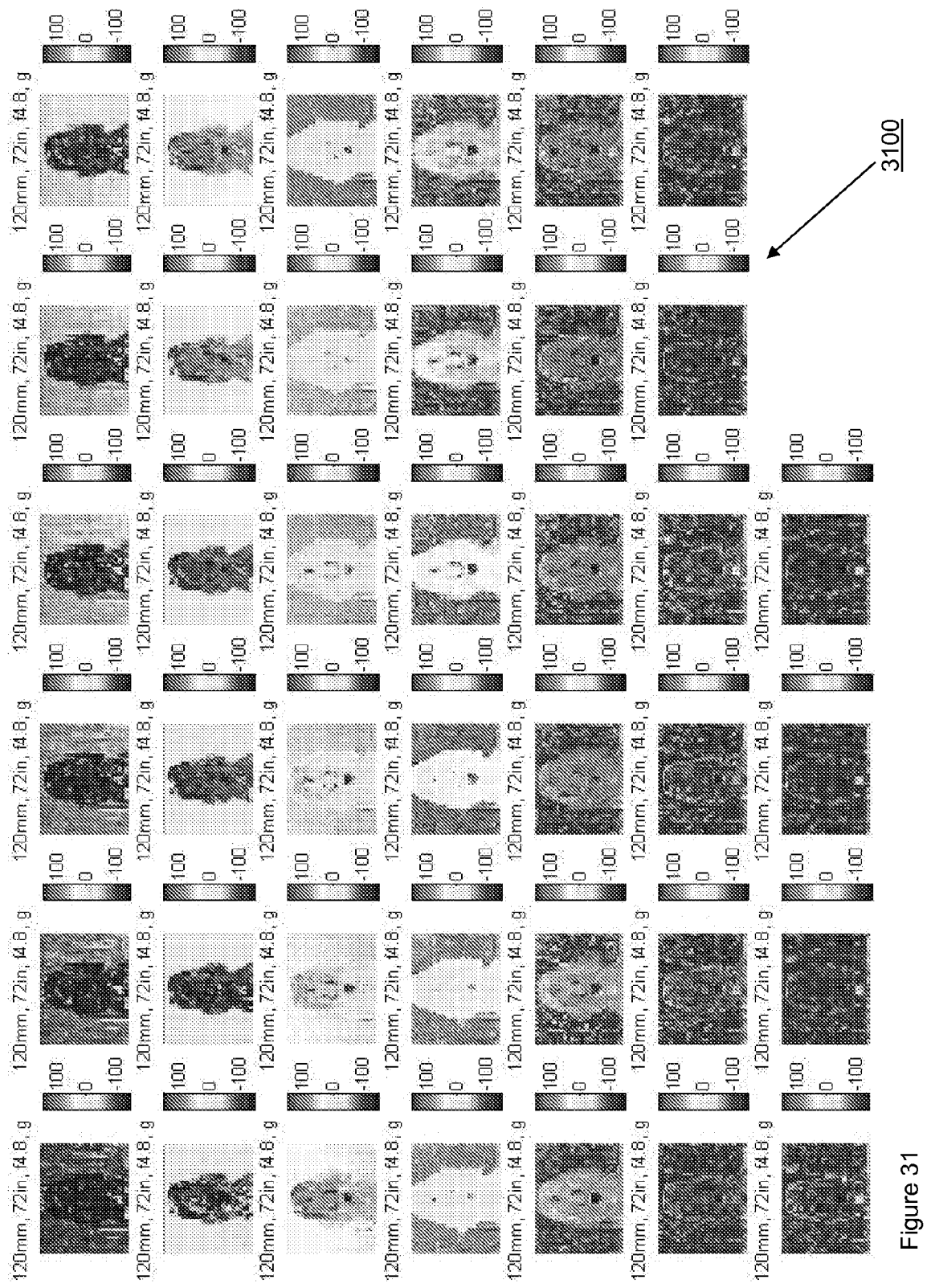
FIG. 31 illustrates one embodiment of an iteration map for the generated image map at differing lens positions.

FIG. 31 illustrates one embodiment of an iteration map 3100 for the generated image map at differing focal depths. In this embodiment, the depth map was generated using the green channel.

Figure 32:
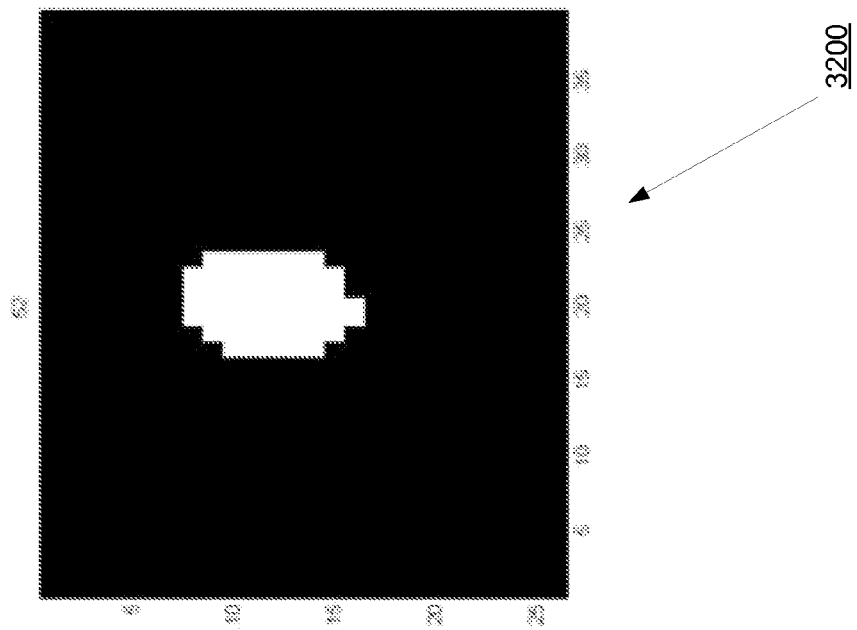
FIG. 32 illustrates one embodiment of a face specific template of the third full resolution test image.

FIG. 32 illustrates one embodiment of a face specific template 3200 of the third full resolution test image. This template is empirically generated and restricts the analysis of the error to the mannequin 2902 face.

Figure 33:
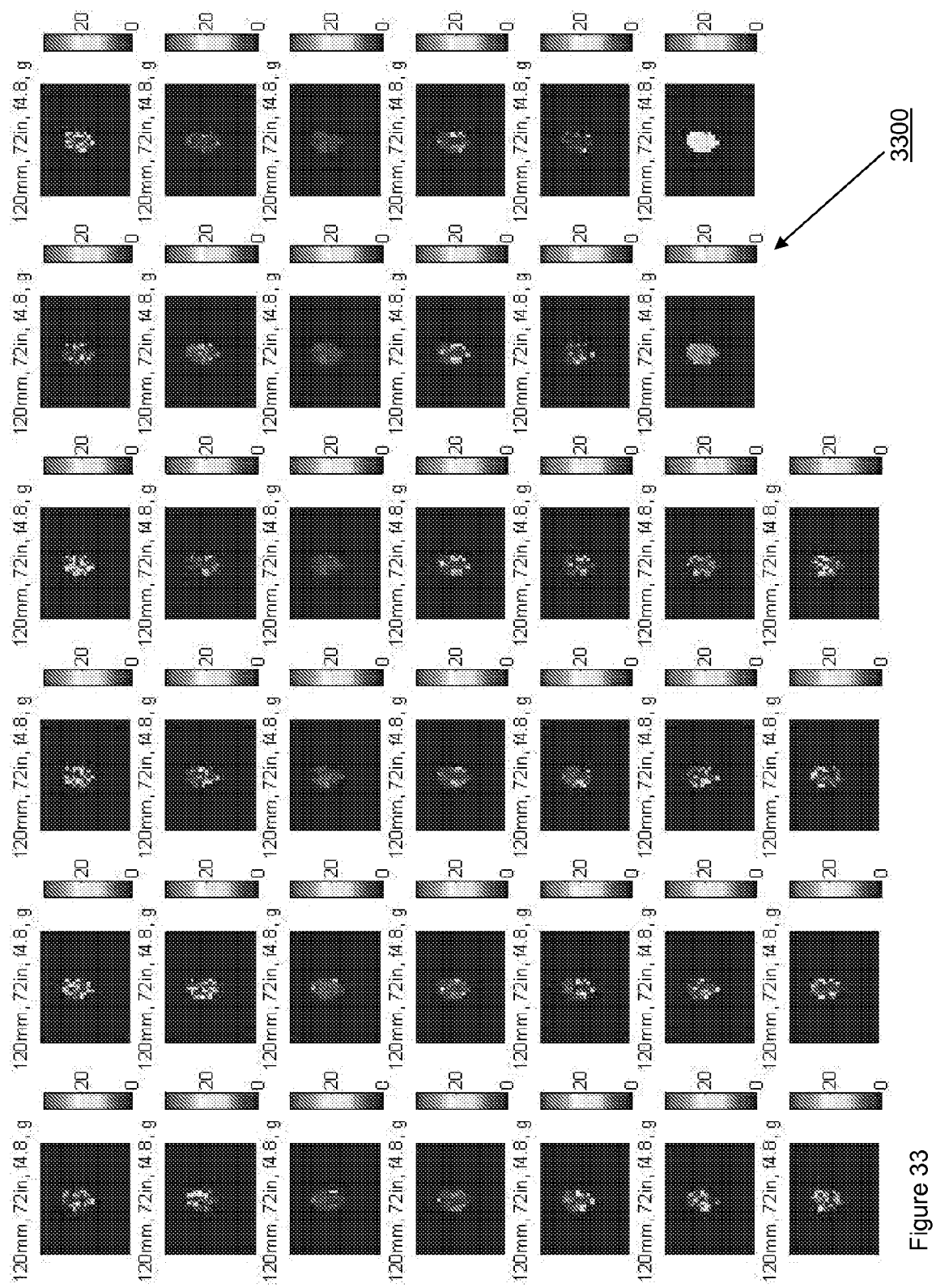
FIG. 33 illustrates one embodiment of a face specific error map of the third full resolution test image.

FIG. 33 illustrates one embodiment of a face specific error map 3300 of the third full resolution test image. As expected, there is large error in the depth for the mannequin 2902 faces for the initial four face specific error maps. The middle twenty-four face specific error maps show little error, as expected from above. More error is shown in the last twelve face specific error maps.

Figure 34:
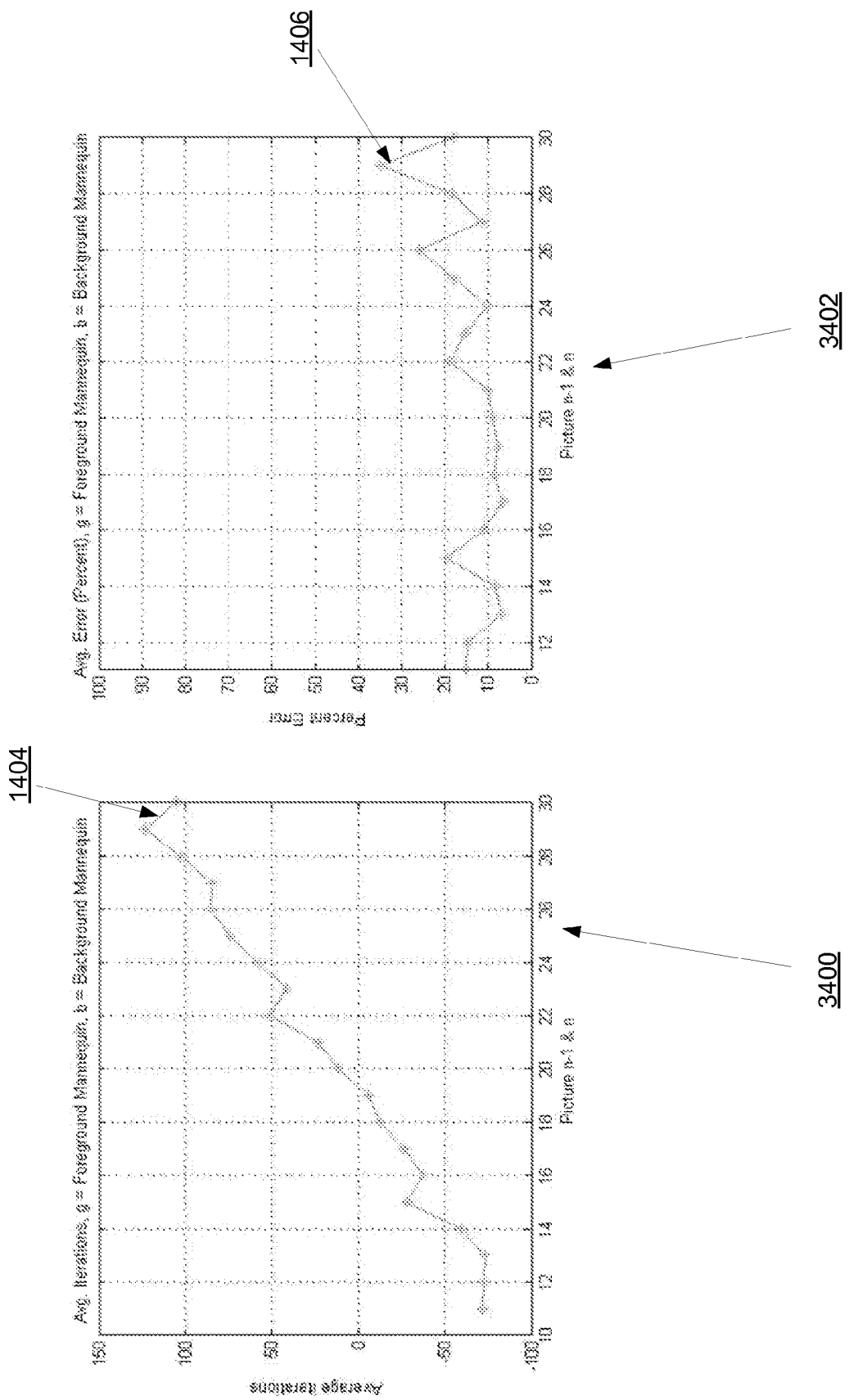
FIG. 34 illustrates graphs of average iterations and average error in generating the depth map for the face specific third full resolution test image.

FIG. 34 illustrates graphs of face specific average iterations 3400 and average error 3402 in generating the depth map for the face specific third full resolution test image. In FIG. 34, graph 2400 illustrates the number of iterations needed to obtain the depth map for a particular picture. Graph 3404 represents number of iterations needed for mannequin 2902.

Graph 3406 illustrates the error in the depth map for mannequin 2902. As noted before, depth maps based on pictures tend to have a fairly constant error.

Figure 35:
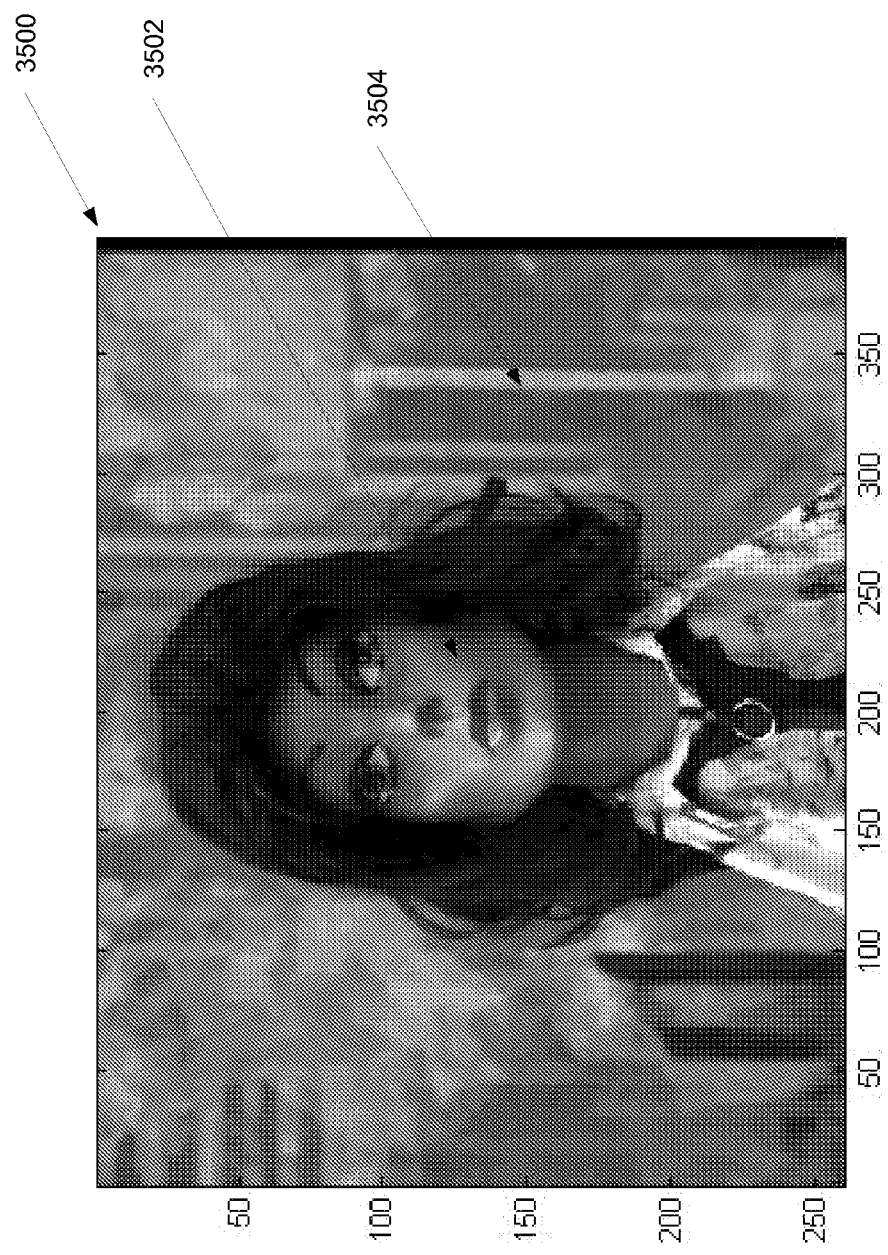
FIG. 35 illustrates one embodiment of a third reduced resolution test image.

FIG. 35 illustrates one embodiment of a third reduced resolution test image 3500 and is the same image as in FIG. 29, except the resolution is quarter video graphics array resolution of 330×340 pixels (k=36 as compared with image 900). Figure. FIG. 3500 comprises mannequin 3502 and background 3504. Image 3500 was acquired with a focal length of 120 mm and aperture of F4.8. Mannequin 3503 is 1.83 meters from the camera sensor.

Figure 36:
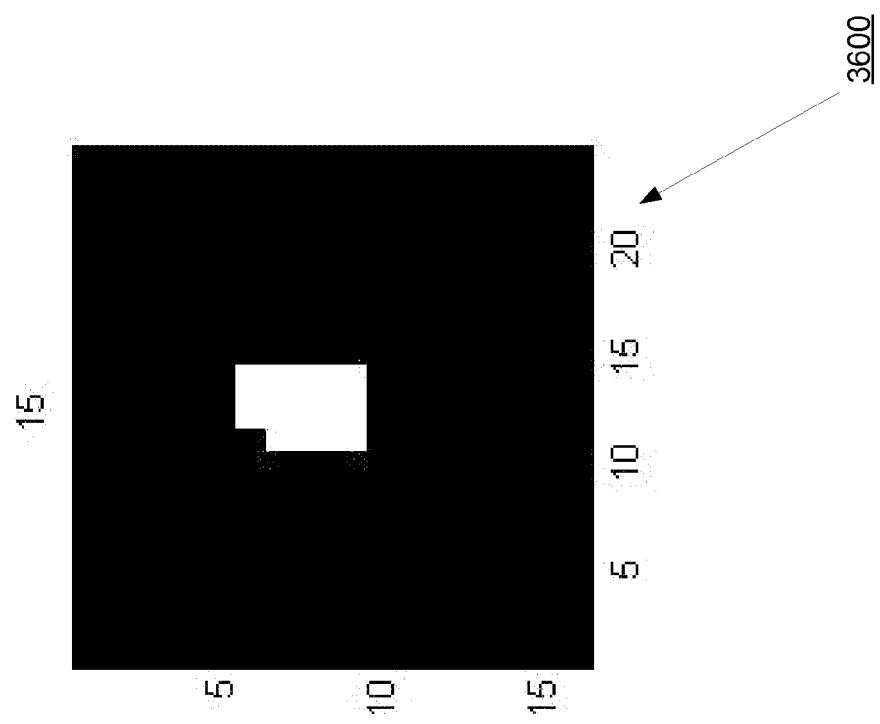
FIG. 36 illustrates one embodiment of a face specific template of the third reduced resolution test image.
Figure 37:
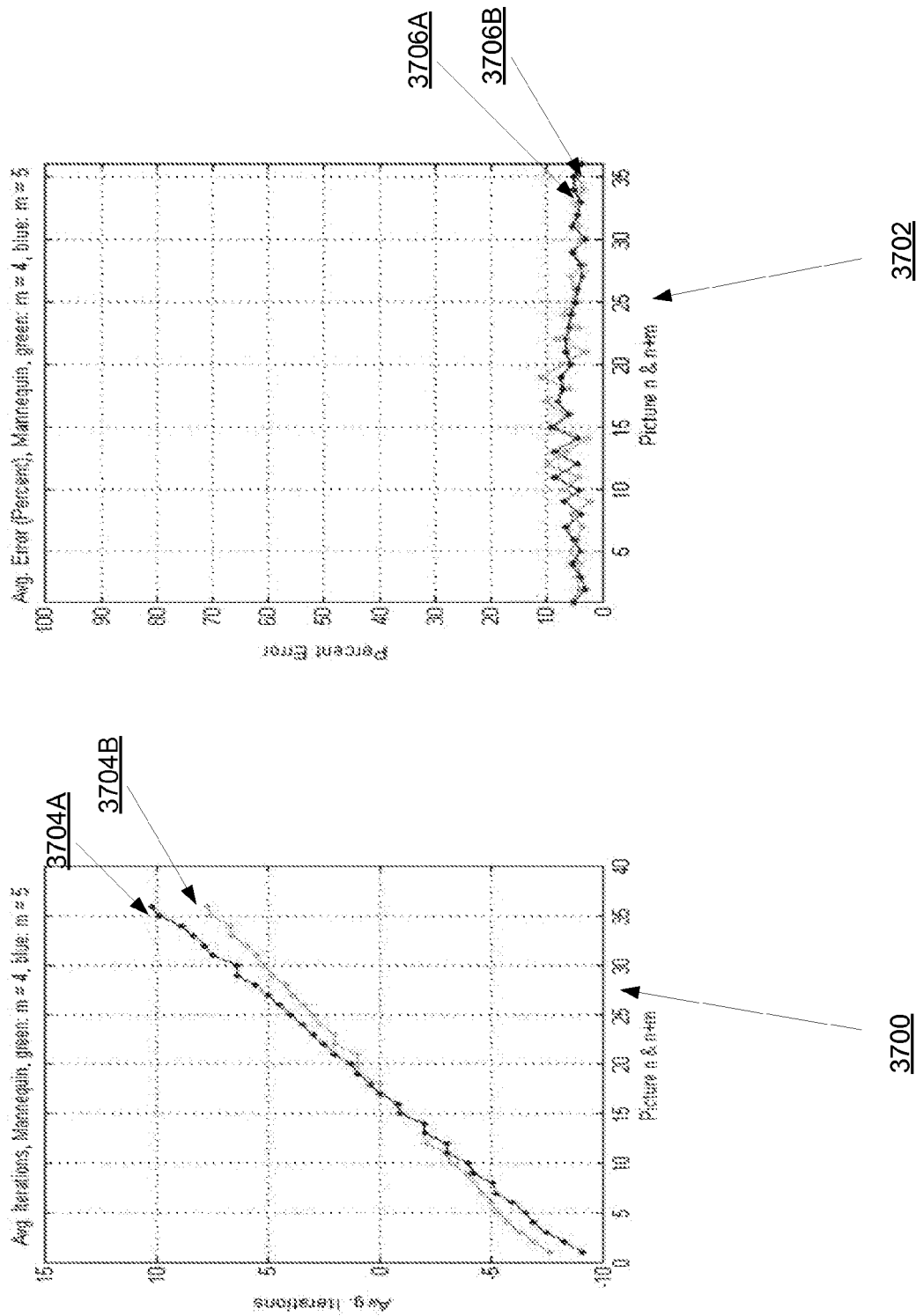
FIG. 37 illustrates graphs of average iterations and average errors in generating the depth map for the face specific third reduced resolution test image.

FIGS. 36-37 illustrate face specific template, average iterations and average error for the third reduced resolution image in FIG. 35. FIG. 36 illustrates one embodiment of a face specific template 3600 of the third reduced resolution test image. This template is empirically generated and restricts the analysis of the error to the mannequin 3502 face.

FIG. 37 illustrates graphs of face specific average iterations 3700 and face specific average error 3702 in generating the depth map for the face specific third reduced resolution test image. In FIG. 37, graph 2400 illustrates the number of iterations needed to converge on the depth map for a particular picture. Curves 3704A-B represent number of iterations needed for a depth of field (at full resolution) of four and five respectively. There is not a wide variation in the number of iterations needed to converge as was demonstrated in the full image case (see, e.g., graph 3400 in FIG. 34). For example, the range in iterations needed as compared with the average is approximately −10 to +10.

Curves 3706A-B represent the error in the depth map for image pairs separated by four and five depth of fields (at full resolution), respectively. Curves 3706A-B tend to track each other and give comparable results.

Figure 38:
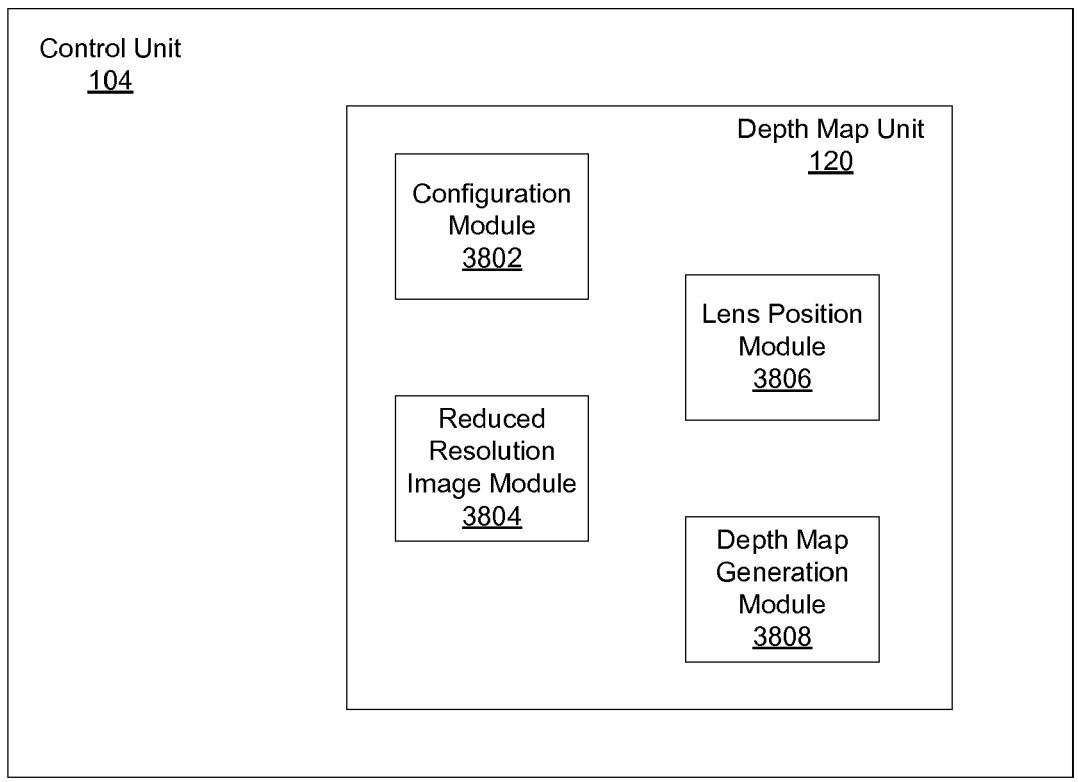
FIG. 38 is a block diagram illustrating one embodiment of an image device control unit that calculates a depth map.

FIG. 38 is a block diagram illustrating one embodiment of an image device control unit that calculates a depth map, such as imaging system described in FIG. 1. In one embodiment, image control unit 106 contains depth map unit 120. Alternatively, image control unit 106 does not contain depth map unit 120, but is coupled to depth map unit 120. Depth map unit 120 comprises configuration module 3802, reduced resolution module 3804, lens position module 3806, and depth map generation module 3808. Configuration module receives parameters that are used to configure modules 3804, 3806, 3808. In particular, configuration module receives the reduction factor input, as described in FIG. 5, at block 502. Reduced resolution module 3804 acquires the reduced resolution images as described in FIG. 5, at blocks 504 and 508 and FIG. 6. Lens position module determines the next position for the second image based on the reduction factor as described in FIG. 5, block 506 and FIG. 7. Depth map generation module 3808 generates a depth map based on the two images as described with reference to FIG. 4.

Figure 39:
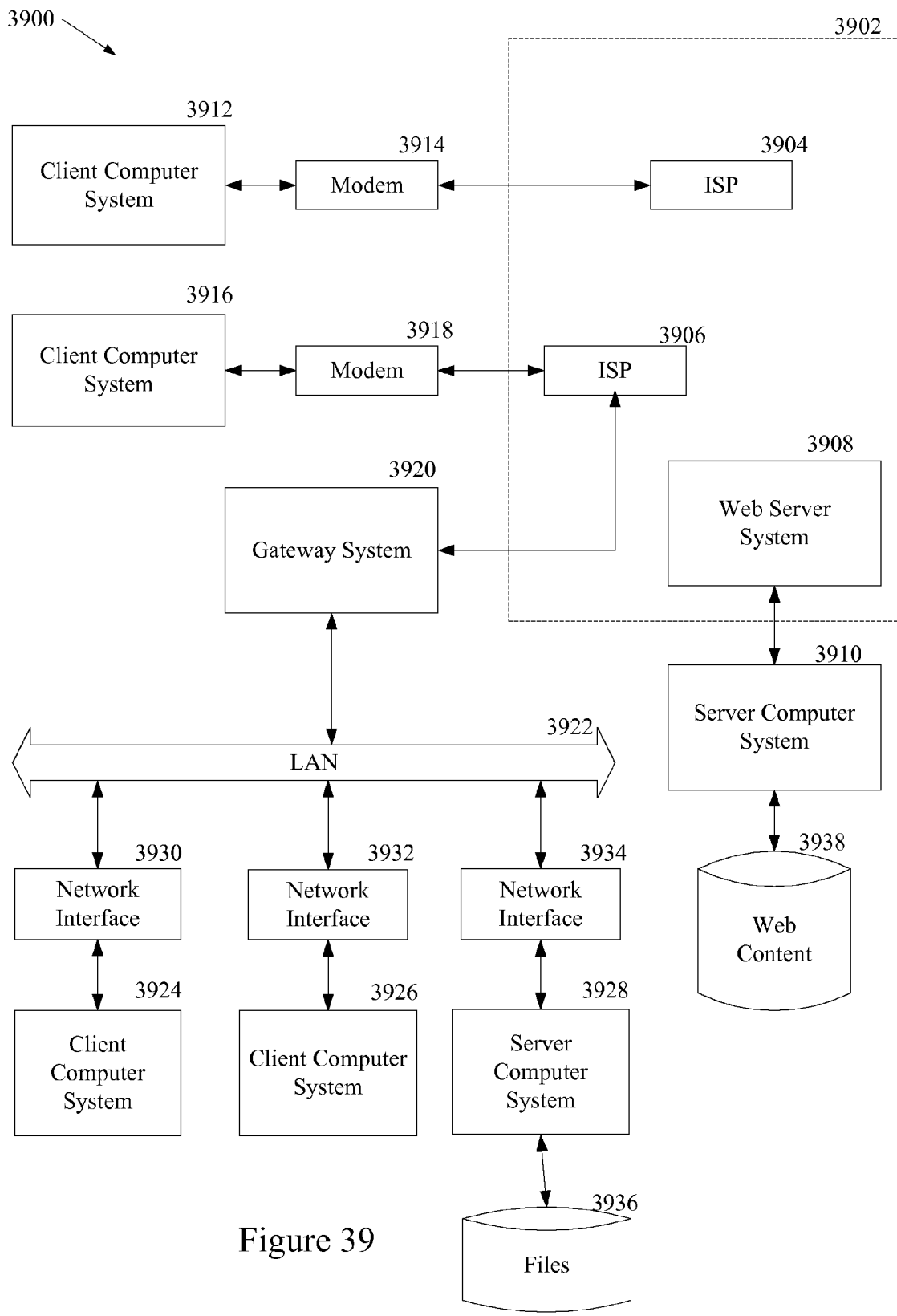
FIG. 39 is a diagram of one embodiment of an operating environment suitable for practicing the present invention.
Figure 40:
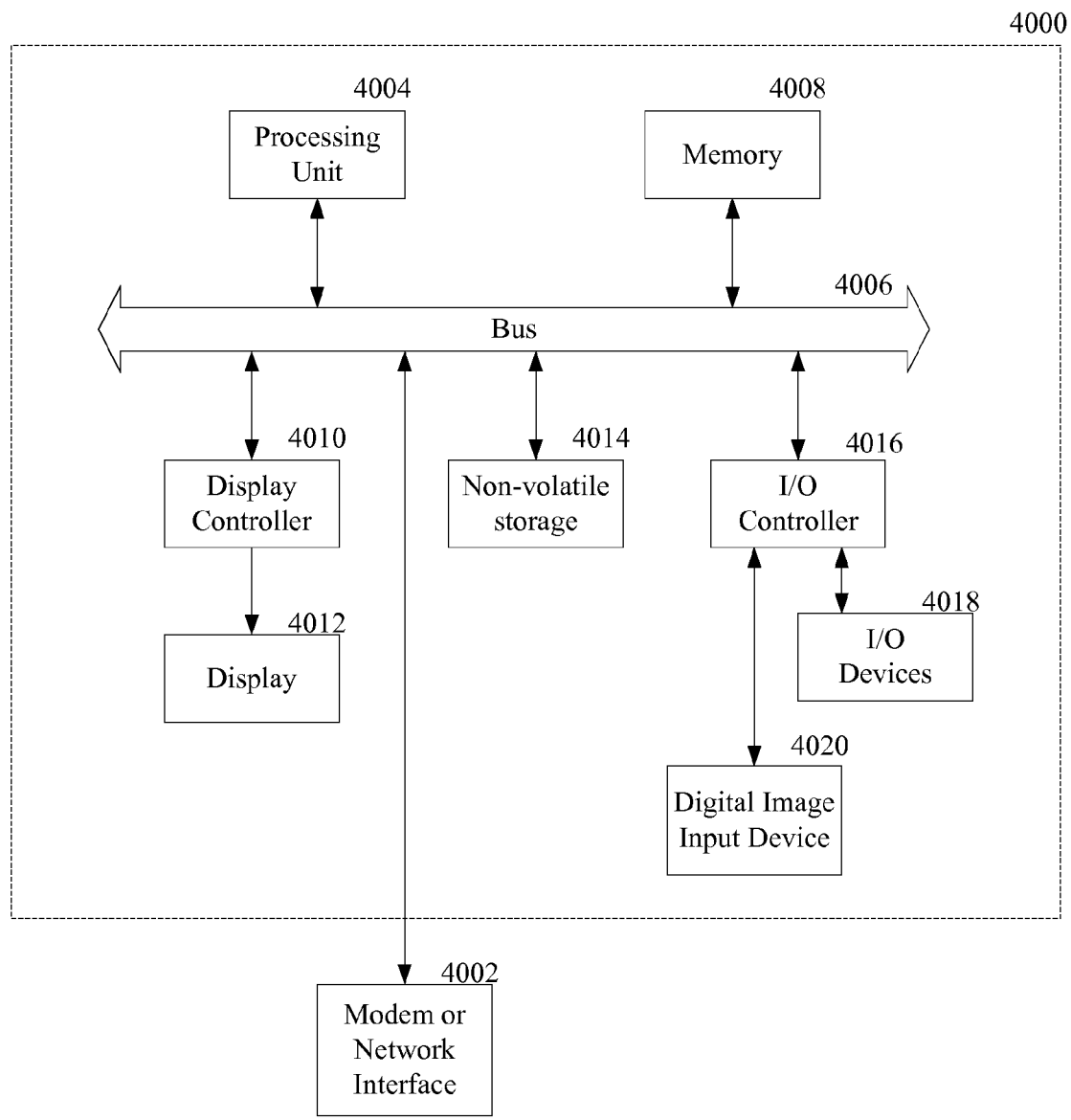
FIG. 40 a diagram of one embodiment of a computer system suitable for use in the operating environment of FIG. 39.

The following descriptions of FIGS. 39-40 is intended to provide an overview of computer hardware and other operating components suitable for performing the methods of the invention described above, but is not intended to limit the applicable environments. One of skill in the art will immediately appreciate that the embodiments of the invention can be practiced with other computer system configurations, including hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

In practice, the methods described herein may constitute one or more programs made up of machine-executable instructions. Describing the method with reference to the flowchart in FIG. 5 enables one skilled in the art to develop such programs, including such instructions to carry out the operations (acts) represented by logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein.

FIG. 39 shows several computer systems 3800 that are coupled together through a network 3902, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3902 is typically provided by Internet service providers (ISP), such as the ISPs 3904 and 3906. Users on client systems, such as client computer systems 3912, 3916, 3924, and 3926 obtain access to the Internet through the Internet service providers, such as ISPs 3904 and 3906. Access to the Internet allows users of the client computer systems to exchange information, receive and send e-mails, and view documents, such as documents which have been prepared in the HTML format. These documents are often provided by web servers, such as web server 3908 which is considered to be "on" the Internet. Often these web servers are provided by the ISPs, such as ISP 3904, although a computer system can be set up and connected to the Internet without that system being also an ISP as is well known in the art.

The web server 3908 is typically at least one computer system which operates as a server computer system and is configured to operate with the protocols of the World Wide Web and is coupled to the Internet. Optionally, the web server 3908 can be part of an ISP which provides access to the Internet for client systems. The web server 3908 is shown coupled to the server computer system 3910 which itself is coupled to web content 640, which can be considered a form of a media database. It will be appreciated that while two computer systems 3908 and 3910 are shown in FIG. 40, the web server system 3908 and the server computer system 3910 can be one computer system having different software components providing the web server functionality and the server functionality provided by the server computer system 3910 which will be described further below.

Client computer systems 3912, 3916, 3924, and 3926 can each, with the appropriate web browsing software, view HTML pages provided by the web server 3908. The ISP 3904 provides Internet connectivity to the client computer system 3912 through the modem interface 3914 which can be considered part of the client computer system 3912. The client computer system can be a personal computer system, a network computer, a Web TV system, a handheld device, or other such computer system. Similarly, the ISP 3906 provides Internet connectivity for client systems 3916, 3924, and 3926, although as shown in FIG. 6, the connections are not the same for these three computer systems. Client computer system 3916 is coupled through a modem interface 3918 while client computer systems 3924 and 3926 are part of a LAN. While FIG. 6 shows the interfaces 3914 and 3918 as generically as a "modem," it will be appreciated that each of these interfaces can be an analog modem, ISDN modem, cable modem, satellite transmission interface, or other interfaces for coupling a computer system to other computer systems. Client computer systems 3924 and 3916 are coupled to a LAN 3922 through network interfaces 3930 and 3932, which can be Ethernet network or other network interfaces. The LAN 3922 is also coupled to a gateway computer system 3920 which can provide firewall and other Internet related services for the local area network. This gateway computer system 3920 is coupled to the ISP 3906 to provide Internet connectivity to the client computer systems 3924 and 3926. The gateway computer system 3920 can be a conventional server computer system. Also, the web server system 3908 can be a conventional server computer system.

Alternatively, as well-known, a server computer system 3928 can be directly coupled to the LAN 3922 through a network interface 3934 to provide files 3936 and other services to the clients 3924, 3926, without the need to connect to the Internet through the gateway system 3920. Furthermore, any combination of client systems 3912, 3916, 3924, 3926 may be connected together in a peer-to-peer network using LAN 3922, Internet 3902 or a combination as a communications medium. Generally, a peer-to-peer network distributes data across a network of multiple machines for storage and retrieval without the use of a central server or servers. Thus, each peer network node may incorporate the functions of both the client and the server described above.

FIG. 40 shows one example of a conventional computer system that can be used as imaging system. The computer system 4000 interfaces to external systems through the modem or network interface 4002. It will be appreciated that the modem or network interface 4002 can be considered to be part of the computer system 4000. This interface 4002 can be an analog modem, ISDN modem, cable modem, token ring interface, satellite transmission interface, or other interfaces for coupling a computer system to other computer systems. The computer system 4002 includes a processing unit 4004, which can be a conventional microprocessor such as an Intel Pentium microprocessor or Motorola Power PC microprocessor. Memory 4008 is coupled to the processor 4004 by a bus 4006. Memory 4008 can be dynamic random access memory (DRAM) and can also include static RAM (SRAM). The bus 4006 couples the processor 4004 to the memory 4008 and also to non-volatile storage 4014 and to display controller 4010 and to the input/output (I/O) controller 4016. The display controller 4010 controls in the conventional manner a display on a display device 4012 which can be a cathode ray tube (CRT) or liquid crystal display (LCD). The input/output devices 4018 can include a keyboard, disk drives, printers, a scanner, and other input and output devices, including a mouse or other pointing device. The display controller 4010 and the I/O controller 4016 can be implemented with conventional well known technology. A digital image input device 4020 can be a digital camera which is coupled to an I/O controller 4016 in order to allow images from the digital camera to be input into the computer system 4000. The non-volatile storage 4014 is often a magnetic hard disk, an optical disk, or another form of storage for large amounts of data.

Some of this data is often written, by a direct memory access process, into memory 4008 during execution of software in the computer system 4000. One of skill in the art will immediately recognize that the terms "computer-readable medium" and "machine-readable medium" include any type of storage device that is accessible by the processor 4004 and also encompass a carrier wave that encodes a data signal.

Network computers are another type of computer system that can be used with the embodiments of the present invention. Network computers do not usually include a hard disk or other mass storage, and the executable programs are loaded from a network connection into the memory 4008 for execution by the processor 4004. A Web TV system, which is known in the art, is also considered to be a computer system according to the embodiments of the present invention, but it may lack some of the features shown in FIG. 40, such as certain input or output devices. A typical computer system will usually include at least a processor, memory, and a bus coupling the memory to the processor.

It will be appreciated that the computer system 4000 is one example of many possible computer systems, which have different architectures. For example, personal computers based on an Intel microprocessor often have multiple buses, one of which can be an input/output (I/O) bus for the peripherals and one that directly connects the processor 4004 and the memory 4008 (often referred to as a memory bus). The buses are connected together through bridge components that perform any necessary translation due to differing bus protocols.

It will also be appreciated that the computer system 4000 is controlled by operating system software, which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 4014 and causes the processor 4004 to execute the various acts required by the operating system to input and output data and to store data in memory, including storing files on the non-volatile storage 4014.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising:
   generating a first and second reduced resolution image using reduction information for the first and second reduced resolution image, the first and second reduced resolution image having a pixel size;
   computing a blur difference in the first and second reduced resolution images, wherein a blur radius of the blur difference is larger than the pixel size; and
   calculating a depth map based on the blur difference of the first and second reduced resolution images.

2. The computerized method of claim 1, wherein each pixel of the first reduced image comprises averaging a block of pixels from a full resolution image.

3. The computerized method of claim 2, wherein the averaging is calculated from one of full color pixel information and one color channel pixel information.

4. The computerized method of claim 1, wherein the blur difference is larger than a pixel size of the first reduced resolution image and second reduced resolution images.

5. The computerized method of claim 1, wherein the image reduction information is a factor used to reduce the image dimensions.

6. The computerized method of claim 5, wherein image reduction information factor is a factor k.

7. The computerized method of claim 1, wherein the first reduced resolution image has a same aspect ratio as a full resolution image.

8. The computerized method of claim 1, wherein the calculating the depth map simulates a Gaussian blur with a convolving kernel related to a pillbox blur quantity.

9. The computerized method of claim 1, wherein the generating the first and second reduced resolution images is based on a first and second full resolution images, wherein the first and second full resolution images were acquired with a separation of more than one depth of field.

10. A non-transitory machine readable medium having executable instructions to cause a processor to perform a method comprising:
    generating a first and second reduced resolution image using reduction information for the first and second reduced resolution image, the first and second reduced resolution image having a pixel size;
    computing a blur difference in the first and second reduced resolution images, wherein a blur radius of the blur difference is larger than the pixel size; and
    calculating a depth map based on the blur difference of the first and second reduced resolution images.

11. The non-transitory machine readable medium of claim 10, wherein each pixel of the first reduced image comprises averaging a block of pixels from a full resolution image.

12. The non-transitory machine readable medium of claim 11, wherein the averaging is calculated from one of full color pixel information and one color channel pixel information.

13. The non-transitory machine readable medium of claim 10, wherein the blur difference is larger than a pixel size of the first reduced resolution image and second reduced resolution images.

14. The non-transitory machine readable medium of claim 10, wherein the image reduction information is a factor used to reduce the image dimensions.

15. The non-transitory machine readable medium of claim 14, wherein image reduction information factor is a factor k.

16. The non-transitory machine readable medium of claim 10, wherein the first reduced resolution image has a same aspect ratio as a full resolution image.

17. The non-transitory machine readable medium of claim 10, wherein the calculating the depth map simulates a Gaussian blur with a convolving kernel related to a pillbox blur quantity.

18. An apparatus comprising:
    means for generating a first and second reduced resolution image using reduction information for the first and second reduced resolution image, the first and second reduced resolution image having a pixel size;
    means for computing a blur difference in the first and second reduced resolution images, wherein a blur radius of the blur difference is larger than the pixel size; and
    means for calculating a depth map based on the blur difference of the first and second reduced resolution images.

19. The apparatus of claim 18, wherein each pixel of the first reduced image comprises averaging a block of pixels from a full resolution image.

20. A system comprising:
a processor;
a memory coupled to the processor though a bus; and
a process executed from the memory by the processor to cause the processor to generate a first and second reduced resolution image using reduction information for the first and second reduced resolution image, the first and second reduced resolution image having a pixel size, compute a blur difference in the first and the second reduced resolution images, wherein a blur radius of the blur difference is larger than the pixel size, and to calculate a depth map based on the blur difference of the first and second reduced resolution images.

* * * * *